US011685188B2

(12) United States Patent
Fawcett et al.

(10) Patent No.: US 11,685,188 B2
(45) Date of Patent: Jun. 27, 2023

(54) DUAL-STATE CASTER AND METHOD

(71) Applicant: Exokinetics, Inc., Pottstown, PA (US)

(72) Inventors: John Christopher Fawcett, Whitehead (GB); Garrett W. Brown, Philadelphia, PA (US)

(73) Assignee: Exokinetics, Inc., West Chester, PA (US)

( * ) Notice: Subject to any disclaimer, the term of this patent is extended or adjusted under 35 U.S.C. 154(b) by 0 days.

(21) Appl. No.: 16/346,363

(22) PCT Filed: Nov. 6, 2017

(86) PCT No.: PCT/US2017/060163
§ 371 (c)(1),
(2) Date: Apr. 30, 2019

(87) PCT Pub. No.: WO2018/089303
PCT Pub. Date: May 17, 2018

(65) Prior Publication Data
US 2020/0047552 A1    Feb. 13, 2020

Related U.S. Application Data

(60) Provisional application No. 62/420,383, filed on Nov. 10, 2016.

(51) Int. Cl.
*B60B 33/04* (2006.01)
*B60B 33/00* (2006.01)

(52) U.S. Cl.
CPC .......... *B60B 33/04* (2013.01); *B60B 33/0068* (2013.01); *B60B 33/0071* (2013.01); *B60B 33/0092* (2013.01); *B60B 2200/432* (2013.01)

(58) Field of Classification Search
CPC ............ B60B 33/0081; B60B 33/0092; B60B 33/0078; B60B 33/04; B60B 33/0068; B60B 33/0071
(Continued)

(56) References Cited

U.S. PATENT DOCUMENTS 2,470,978 A * 5/1949 Stanley ................ B62D 63/067
16/44
2,885,720 A * 5/1959 Seeberger ............. B60B 33/021
16/44
(Continued)

FOREIGN PATENT DOCUMENTS

EP   WO0958150 A1   11/1999
EP   2821046 A2     1/2015
(Continued)

OTHER PUBLICATIONS

Extended European Search Report dated Jun. 29, 2020 in European Patent Application 17870030.8.
(Continued)

*Primary Examiner* — Emily M Morgan
(74) *Attorney, Agent, or Firm* — Barnes & Thornburg LLP; Joan Taft Kluger

(57) ABSTRACT

A dual-state caster apparatus having a caster head with a state-change pivot configured to change the steering axis of the caster apparatus. A braking system with a brake control cable is incorporated into the caster apparatus wherein the state-change pivot and the braking system are configured to allow a wheel to swivel without interference with the brake control cable.

15 Claims, 44 Drawing Sheets

(58) Field of Classification Search
USPC .................................................... 16/35 R
See application file for complete search history.

(56) References Cited

U.S. PATENT DOCUMENTS

| | | | | |
|---|---|---|---|---|
| 2,918,300 | A * | 12/1959 | Hendrickson | A01B 5/00 280/80.1 |
| 3,409,105 | A * | 11/1968 | Clinton | A61G 7/00 188/29 |
| 4,000,912 | A * | 1/1977 | Donald | B60B 33/045 280/86.1 |
| 5,020,815 | A | 6/1991 | Harris | |
| 5,590,893 | A * | 1/1997 | Robinson | A61G 5/00 280/250.1 |
| 6,113,117 | A * | 9/2000 | Mimura | A61G 5/023 280/250.1 |
| 6,543,798 | B2 * | 4/2003 | Schaffner | A61G 5/06 16/44 |
| 6,776,428 | B2 * | 8/2004 | Strong | B60G 3/185 16/18 R |
| 6,908,087 | B2 * | 6/2005 | Wintersgill | B60B 33/0002 16/35 R |
| 7,231,689 | B2 * | 6/2007 | Scheiber | A61G 5/10 16/18 R |
| 7,353,566 | B2 * | 4/2008 | Scheiber | B60B 33/04 16/19 |
| 7,559,560 | B2 * | 7/2009 | Li | A61H 3/04 16/35 R |
| 8,191,909 | B2 * | 6/2012 | Livengood | A61H 3/04 188/19 |
| 8,522,397 | B1 * | 9/2013 | Tsai | B60B 33/0042 16/35 R |
| 9,387,880 | B2 | 7/2016 | Gano | |
| 10,406,049 | B2 * | 9/2019 | Liang | A61H 3/04 |
| 2003/0070233 | A1 * | 4/2003 | Ganance | B60B 33/0039 5/620 |
| 2009/0085317 | A1 * | 4/2009 | Livengood | A61B 50/13 701/1 |
| 2010/0132156 | A1 | 6/2010 | Morris | |
| 2011/0247903 | A1 * | 10/2011 | Boukhny | F16D 63/006 188/68 |
| 2012/0160617 | A1 * | 6/2012 | Qi | B60T 1/04 188/1.12 |
| 2014/0216862 | A1 * | 8/2014 | Chen | B60B 33/0086 188/31 |
| 2015/0174957 | A1 * | 6/2015 | Brazier | B60B 33/0057 16/45 |
| 2016/0052339 | A1 * | 2/2016 | Dayt | B60B 33/0021 16/47 |

FOREIGN PATENT DOCUMENTS

| | | | | |
|---|---|---|---|---|
| FR | 2706367 | A1 | 12/1994 | |
| GB | 2168602 | A * | 6/1986 | ........... B60B 33/021 |
| GB | 2431621 | A | 5/2007 | |
| WO | 94008801 | A1 | 4/1994 | |
| WO | 1994021507 | | 9/1994 | |
| WO | 1999015346 | A1 | 4/1999 | |
| WO | 2001019659 | A1 | 3/2001 | |
| WO | 2013182222 | A1 | 12/2013 | |
| WO | 2016010863 | A1 | 1/2016 | |

OTHER PUBLICATIONS

International Search Report and Written Opinion dated Jan. 17, 2018 in International Patent Application PCT/US2017/060163.
First Notification of Examiner's Opinion dated Jun. 17, 2022 in Chinese Patent Application 201780068382.3.
Examiner's Report No. 1 dated Nov. 29, 2022 by the Australian Patent Office in Australian Patent Application No. 2017356870.

* cited by examiner

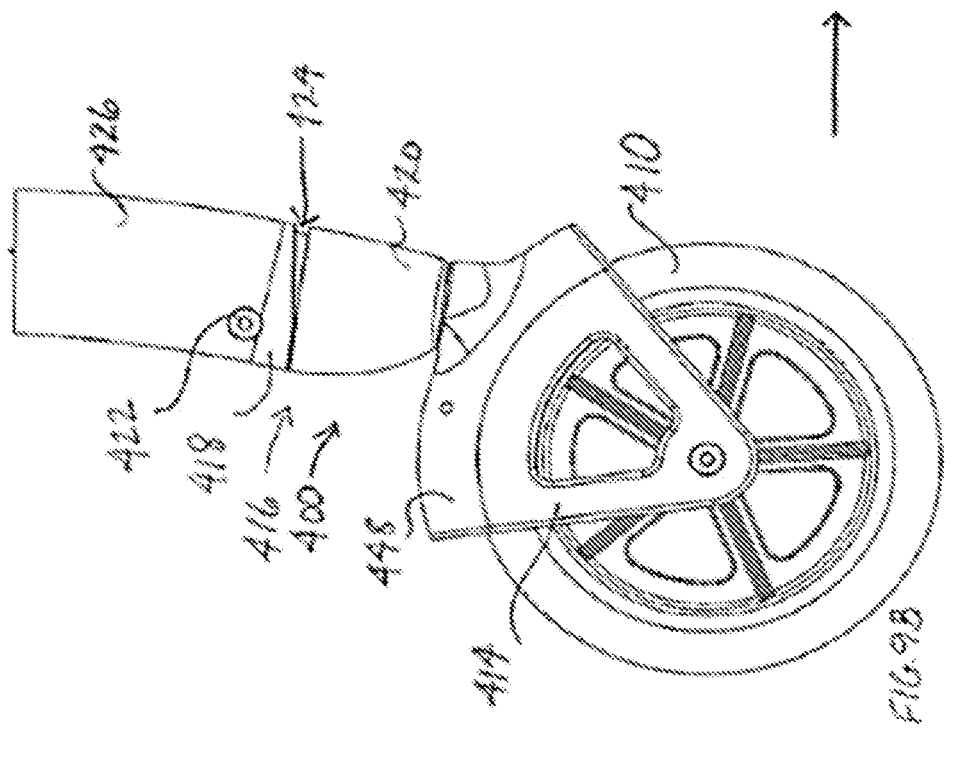
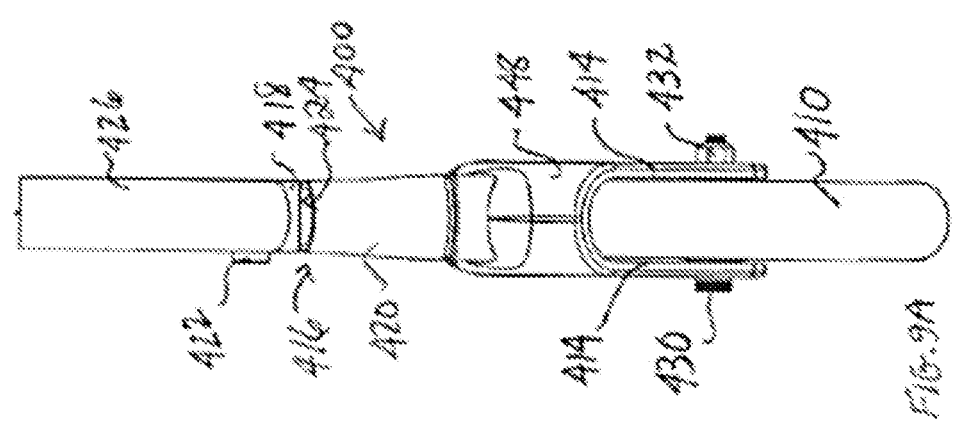

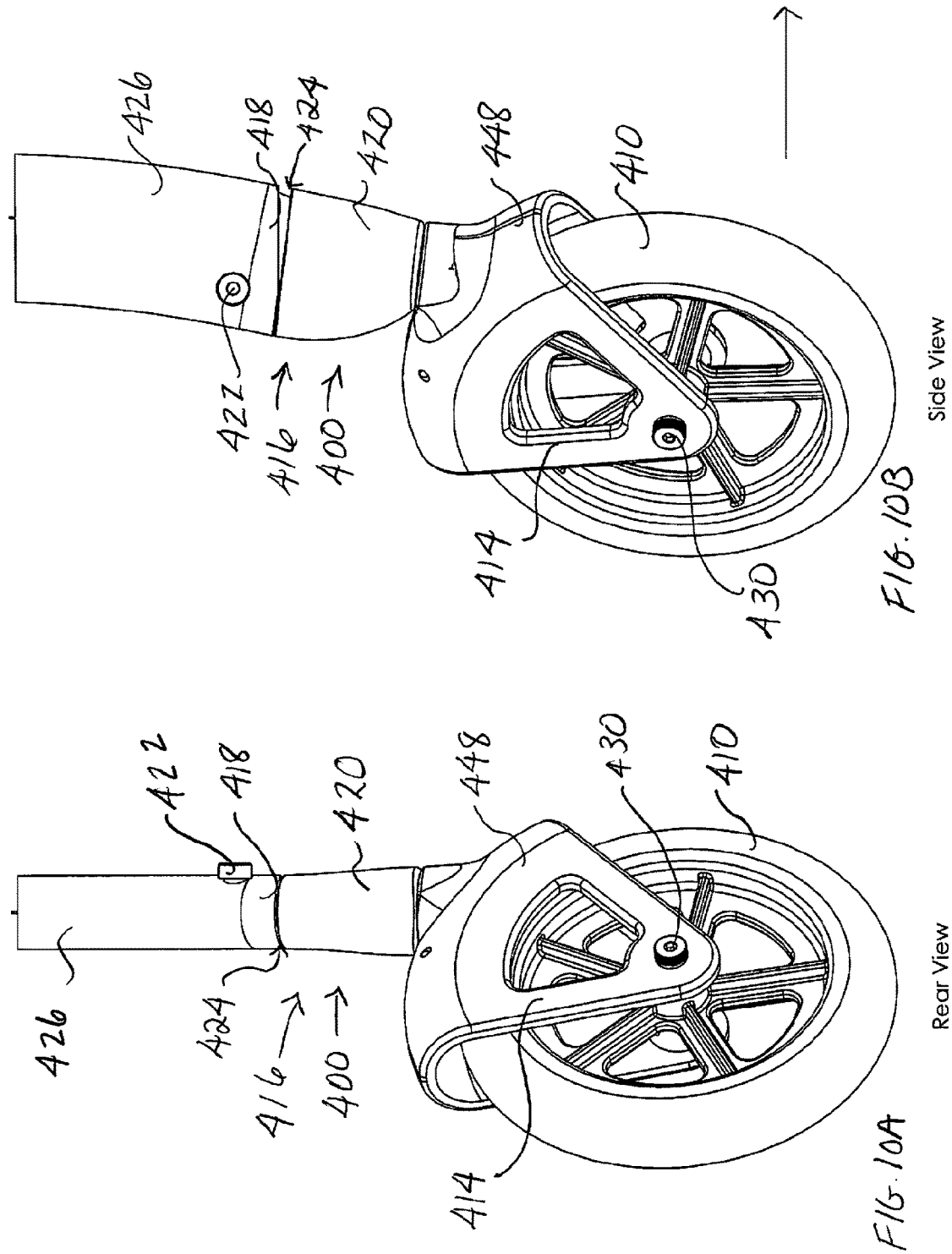

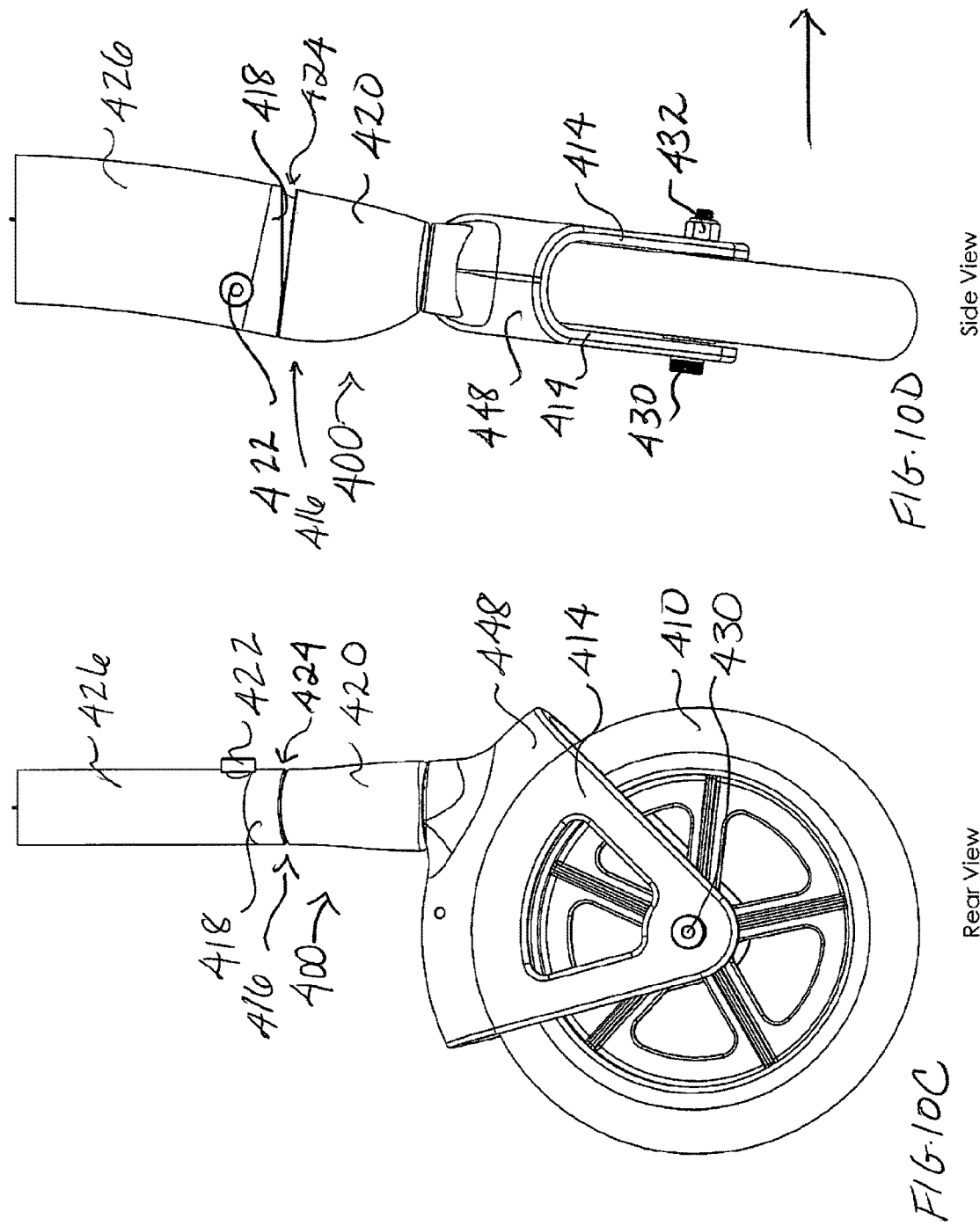

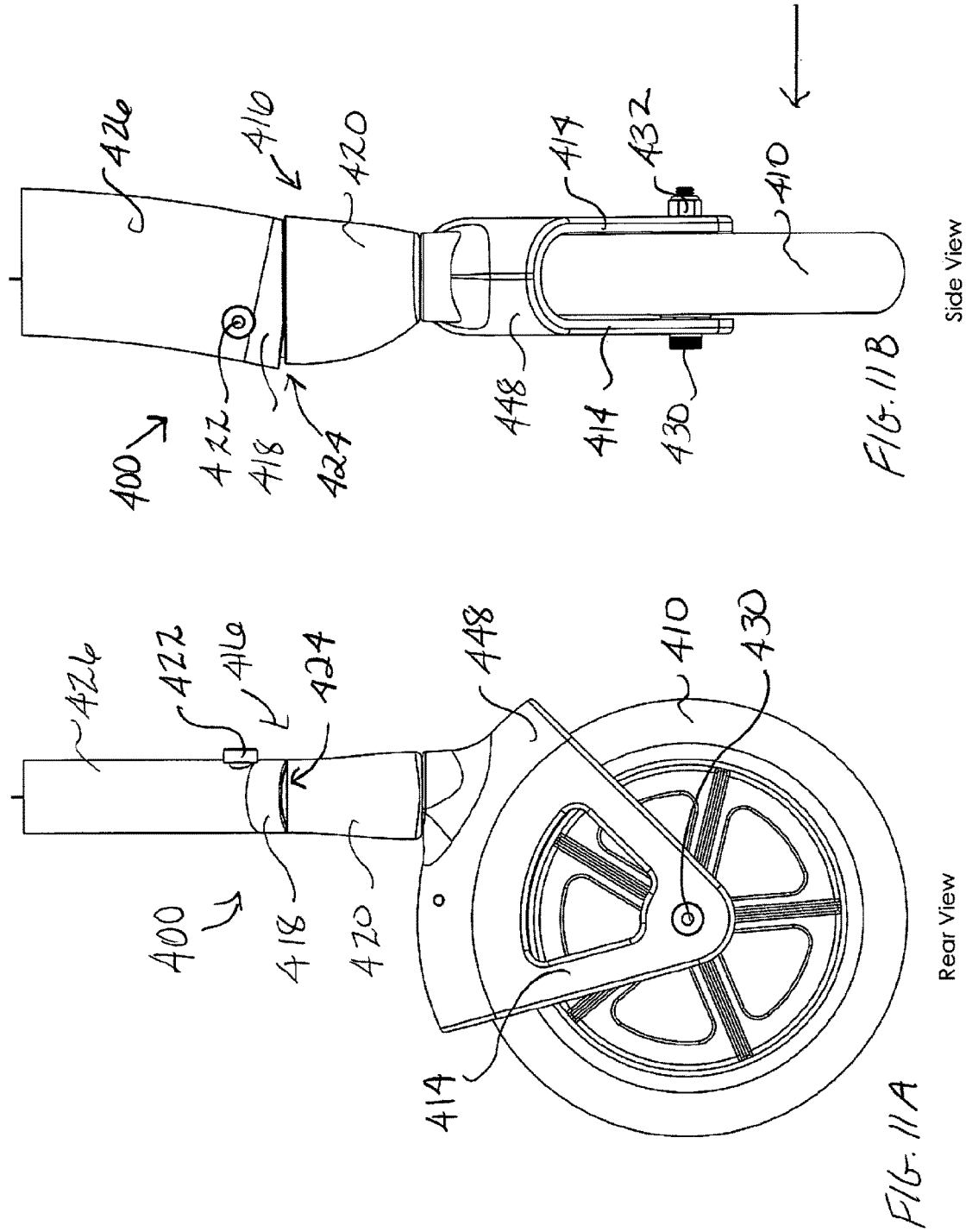

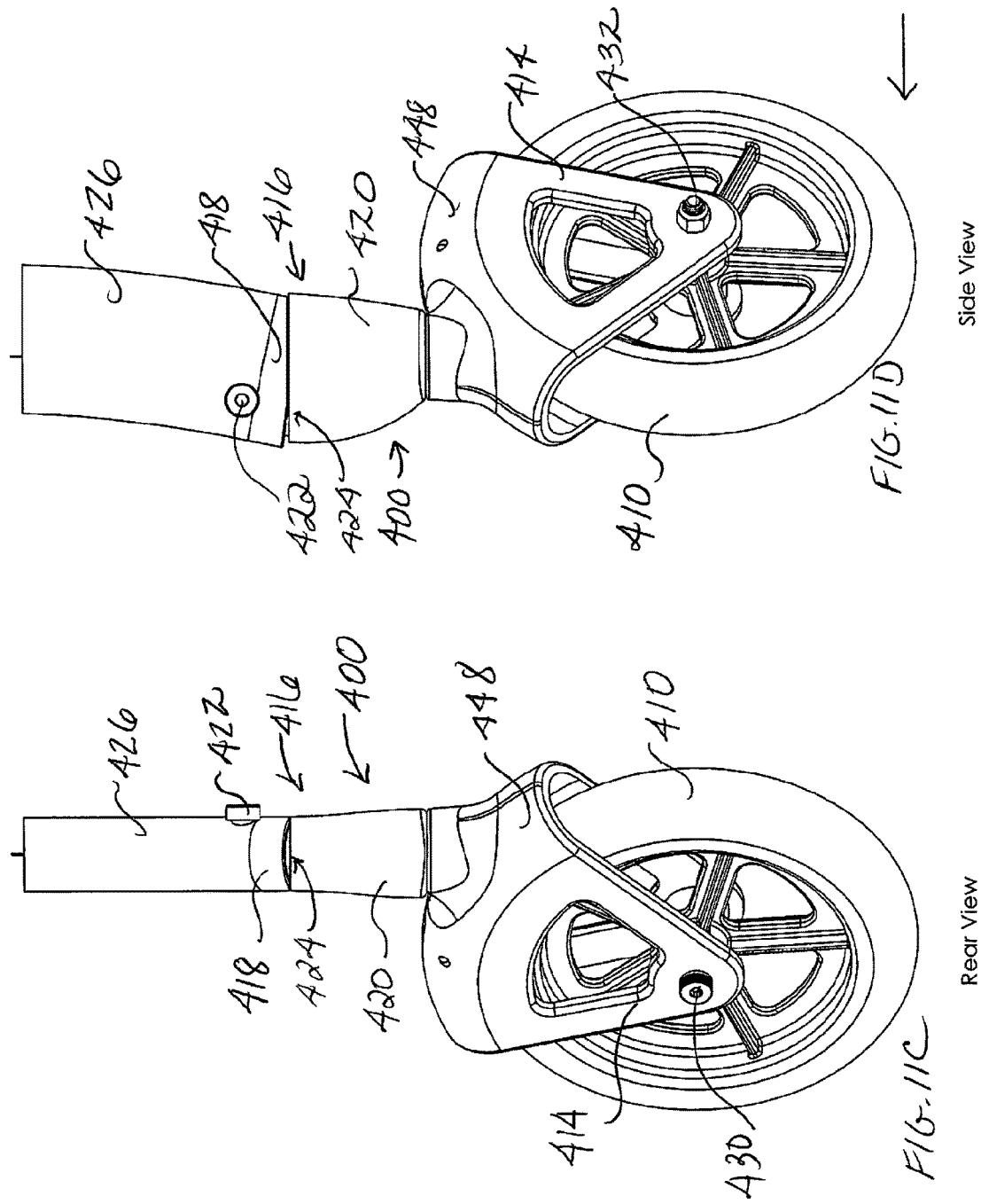

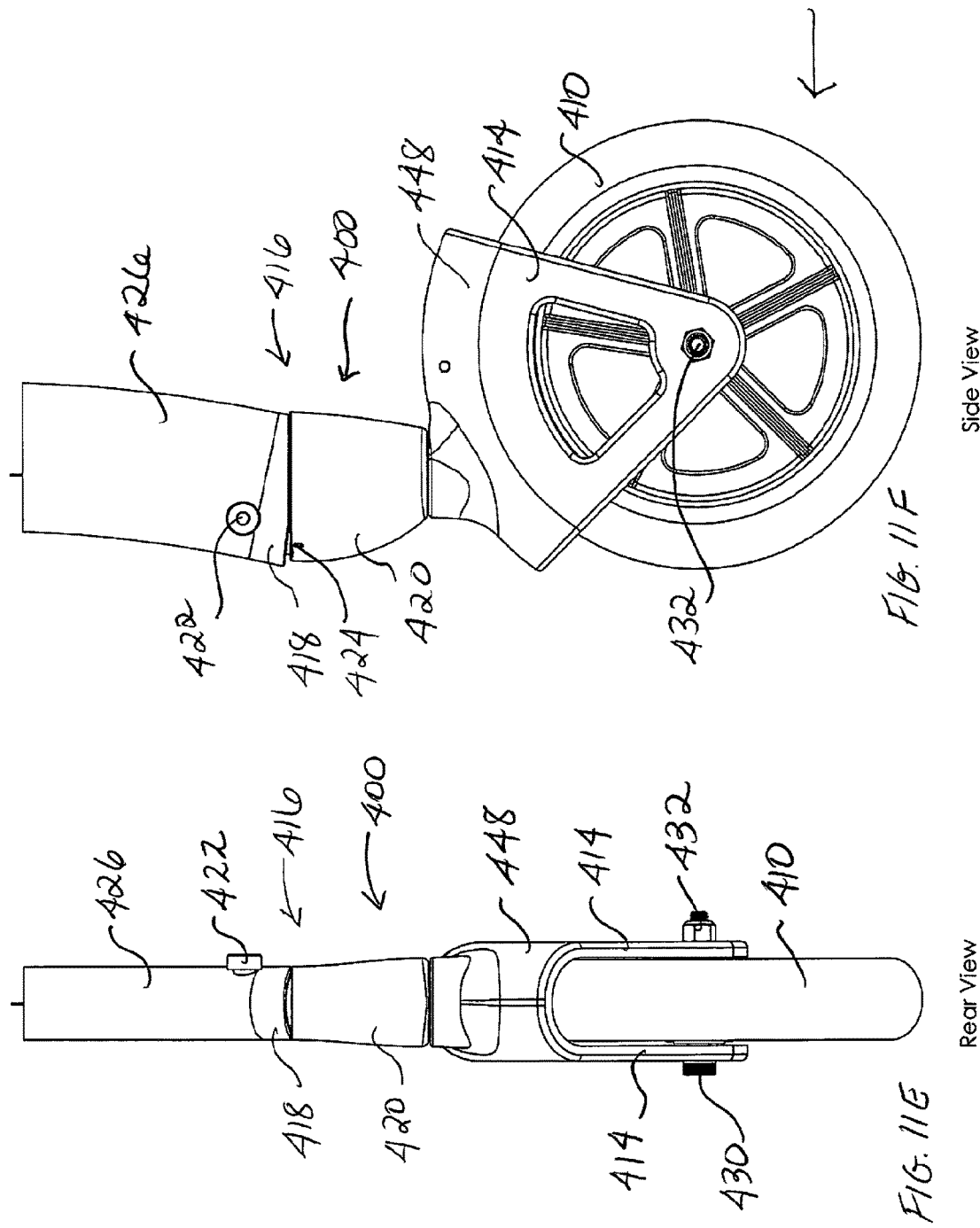

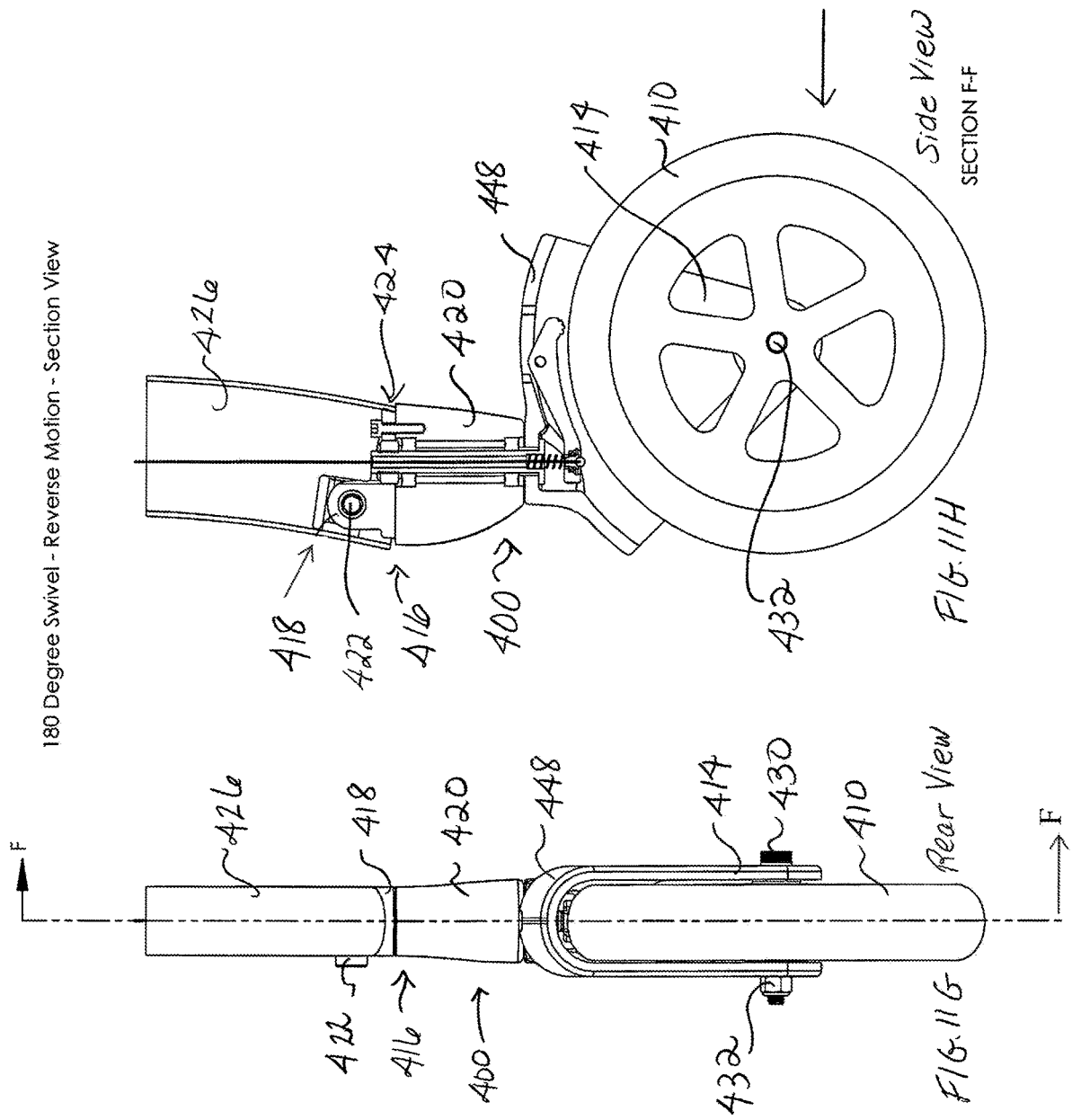

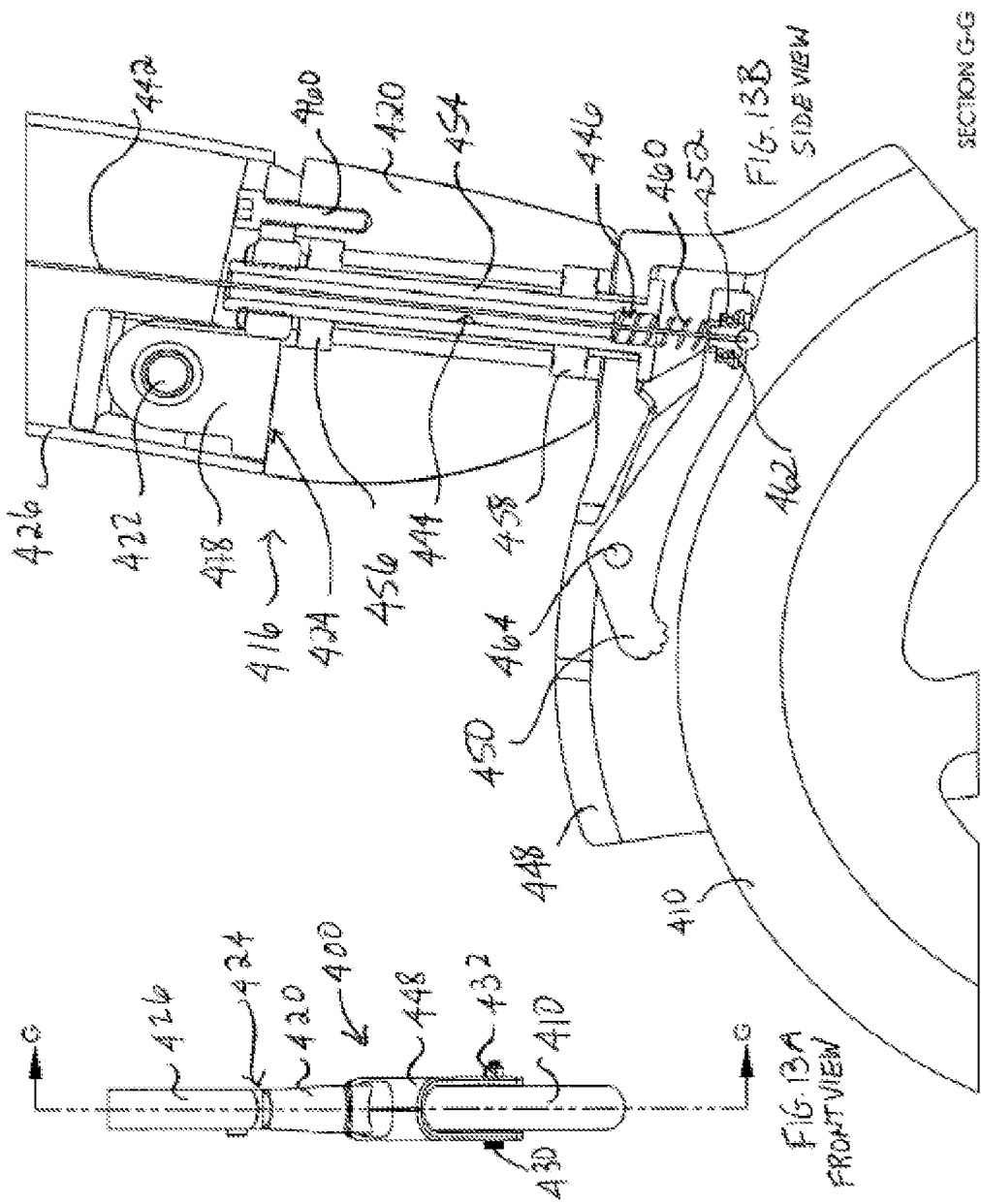

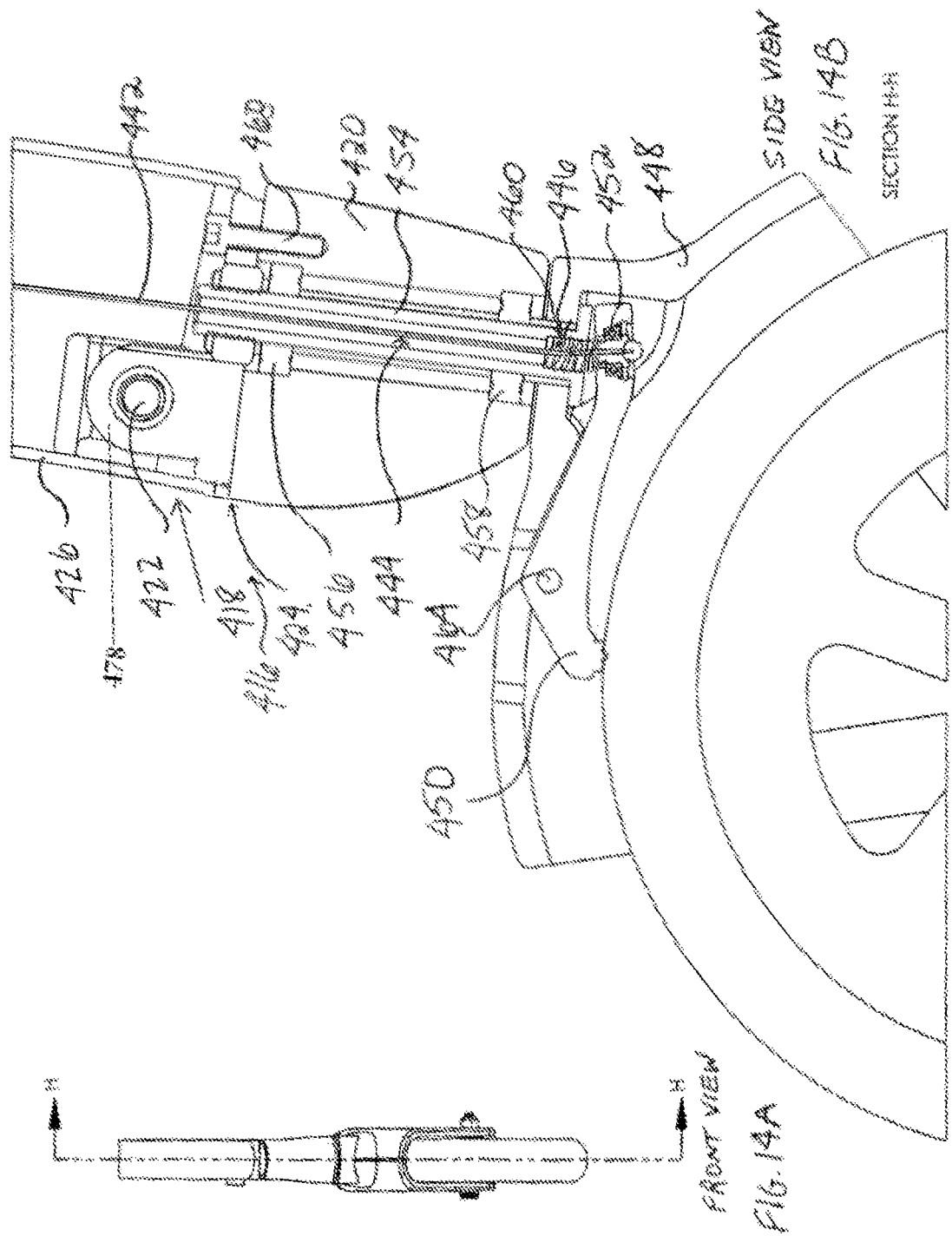

SIDE VIEW

REAR VIEW

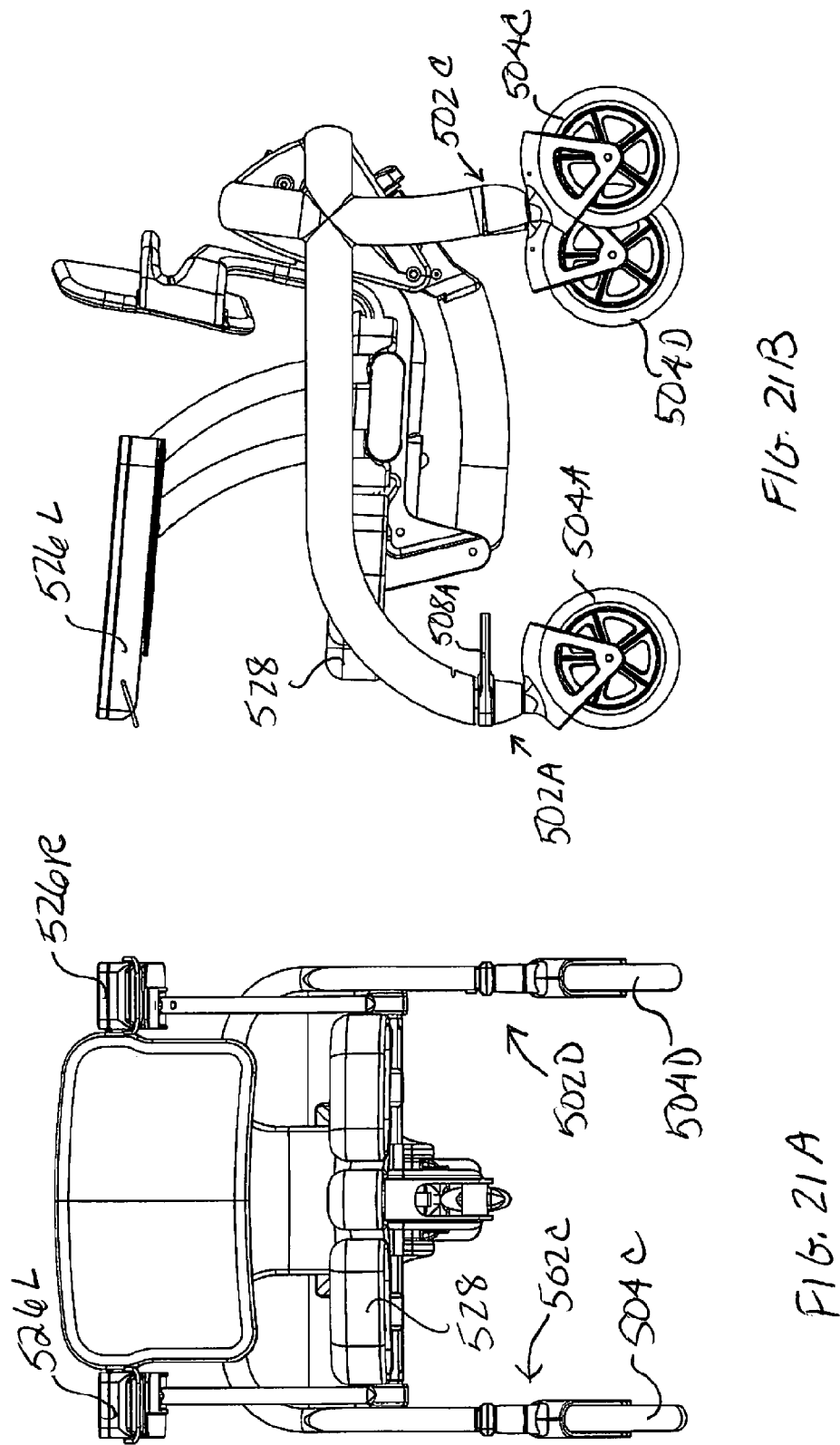

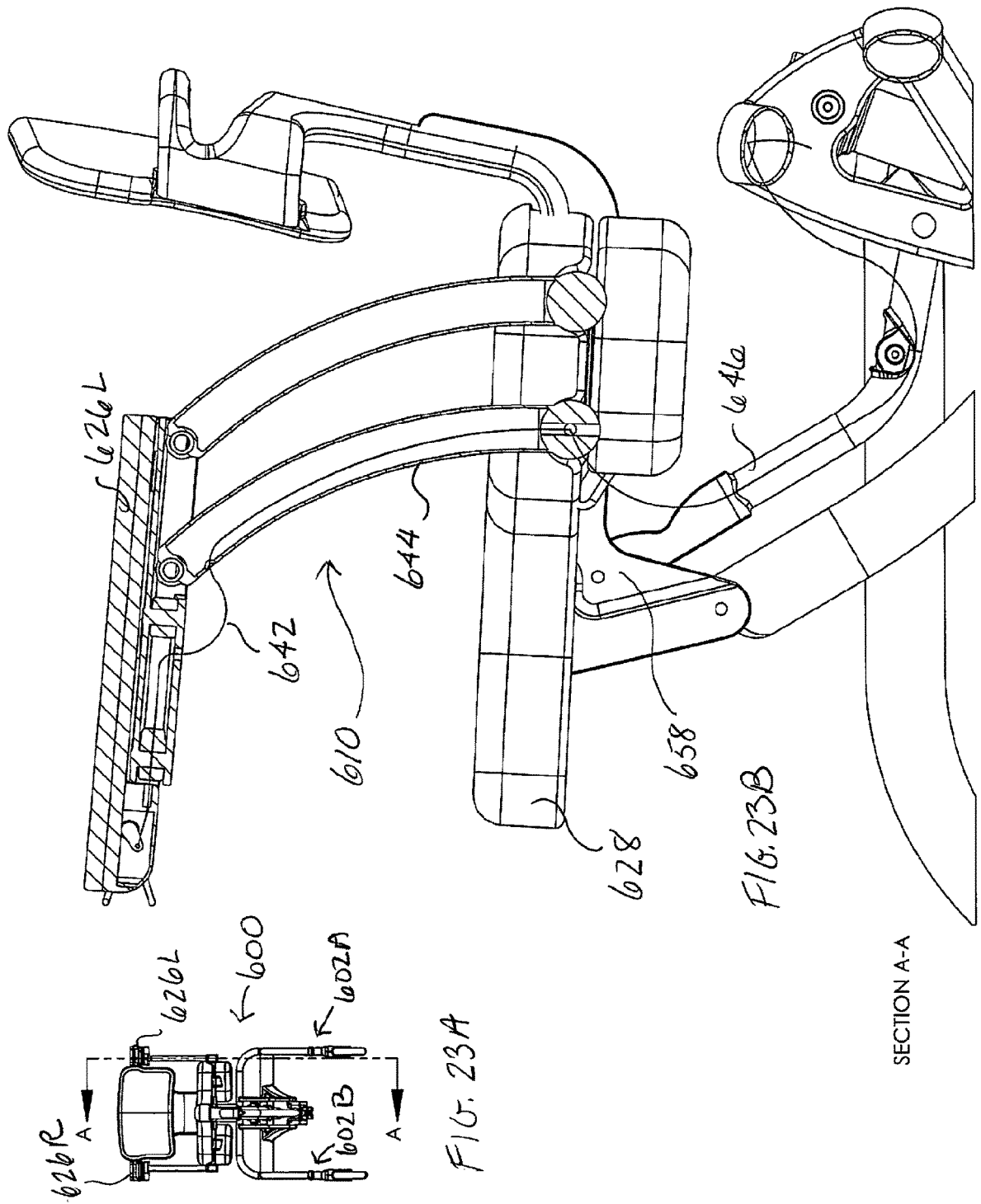

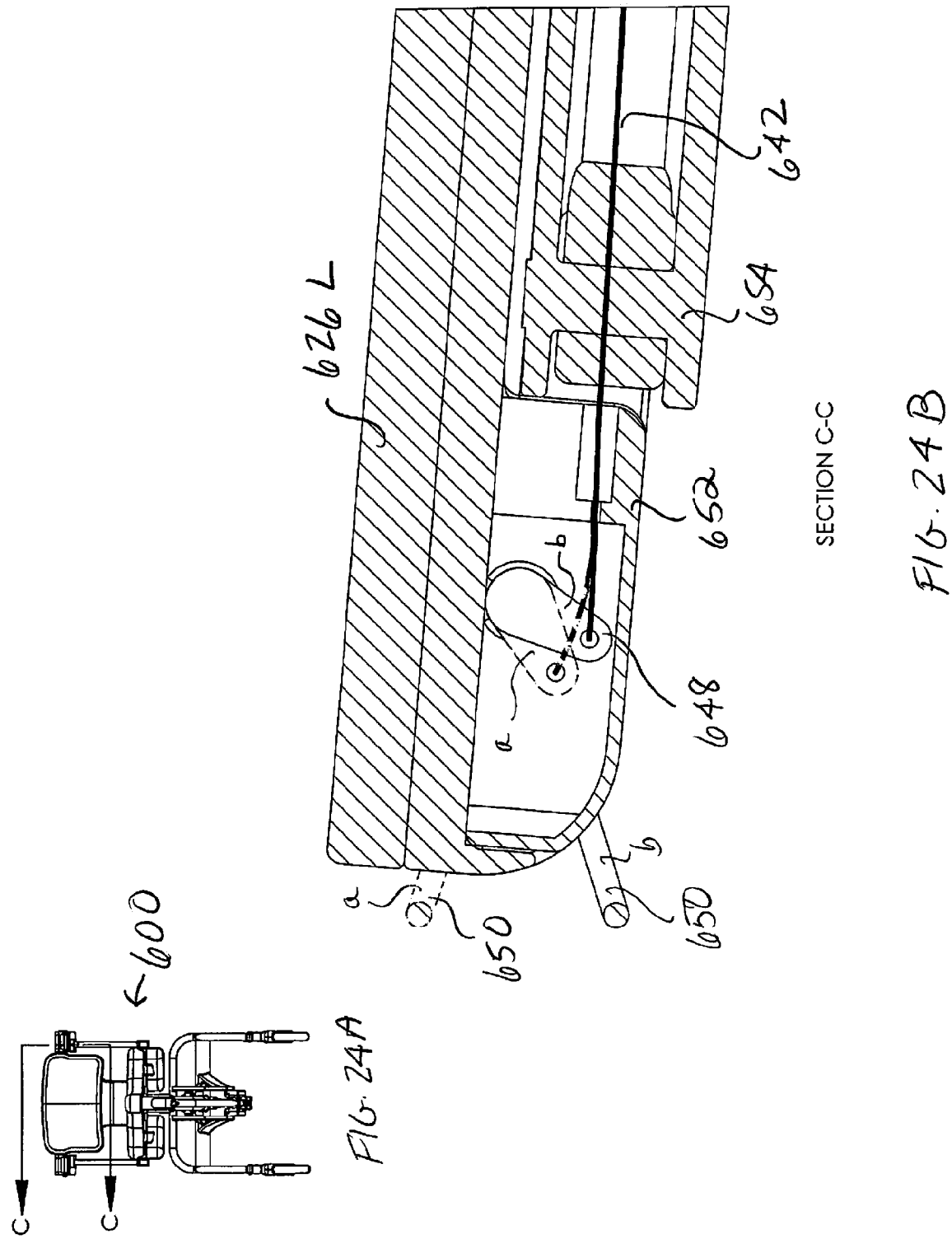

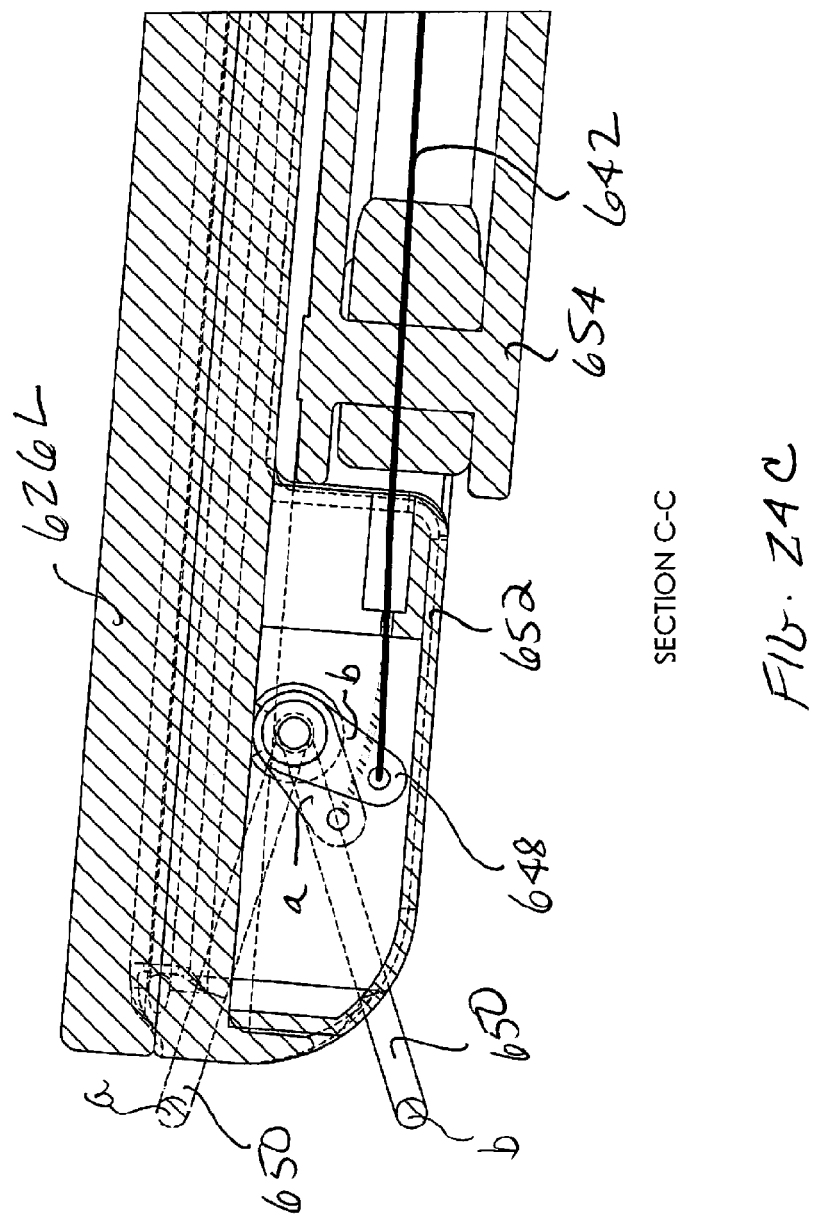

Transition from forward motion to rearward motion

⇐ REAR

FORWARD ⇒

Transition from forward motion to rearward motion

Transition from rearward motion to forward motion

Phase Change Rear View:

Phase Change Side View:

Transition from rearward motion to forward motion

Transition from rearward motion to forward motion

⇐ REAR

FORWARD ⇒

Transition from rearward motion to forward motion

⇐ REAR  FORWARD ⇒

Transition from rearward motion to forward motion

DUAL-STATE CASTER AND METHOD

CROSS-REFERENCE TO RELATED APPLICATIONS

This application is a national stage application of International Patent Application PCT/US2017/060163, filed Nov. 6, 2017, entitled Dual-State Caster and Method, which claims priority to U.S. provisional application Ser. No. 62/420,383, filed Nov. 10, 2016, entitled "Dual-State Caster-Angle Tracking," which is hereby incorporated by reference.

BACKGROUND

In steering wheeled vehicles there are three traditionally accepted ways. The descriptions below relate to human-powered vehicles without steering linkages, but apply also to powered vehicles with or without steering linkages.

Front steering is common in the United States. It works well in that it causes vehicles to track efficiently, meaning that the fixed rear wheels exert drag on a turn, causing the vehicle to straighten up and move forwards. Disadvantages may include the whole vehicle having to be lined up to pass through a narrow opening, and in the case of a cart pushed from the rear, the steering is at the opposite end from the force required to cause the turn—a full shopping cart requires a lot of torque from the pusher at the rear to change the turn angle at the front. As used herein, "cart" includes any apparatus to which one or more casters are attached. Illustrative examples of carts include dollies, wheel chairs and shopping carts.

Rear steering is common in Europe. It is more maneuverable in some ways for the same reason as it is easier to park a car by reversing into a space. The pusher can also exert turning torque directly at the steering. A disadvantage may be instability. If left to roll unattended, the fixed-wheel drag at the front may tend to spin the cart around to roll backwards.

Four-wheel steering is less common but it is found, for example, at building-supply stores and warehouses. Especially for large carts, it may offer significant maneuverability, and allow a cart to be easily parked, and moved through, or into, spaces where a two-wheel steering cart could get stuck. A disadvantage may be little or no tracking, causing a heavily-laden cart to be difficult to steer and control.

Typically with conventional casters, rear-wheel steering makes castered vehicles unstable at speed, causing them to spin around and run backwards, but front-wheel steering may cause vehicles to get stuck in doorways, and require pre-planning to navigate tight spaces. Four-wheel steering may be great for navigating tight spaces, but may be useless at cruising speed. Cornering at speed may cause four-wheel-steering vehicles to oversteer uncontrollably and spin in 360s.

Accordingly, although casters have been in use for many years, nonetheless conventional designs can still be improved to address some or all of the disadvantages described above.

SUMMARY

A caster apparatus is provided having a steering axis and a caster head configured to be rotationally connected to a wheel, wherein the wheel swivels with respect to the caster head about the steering axis. The caster head has an upper pivot component rotationally connected about a state-change pivot to a lower housing, wherein the state-change pivot is configured to change the steering axis of the caster apparatus. An interface between the upper pivot component and the lower housing, or other means, accommodates and limits rotation of the upper pivot component about the state-change pivot. A swivel pivot axle extending through the lower housing accommodates a brake control cable to allow rotation of the wheel with respect to the caster head without interference by the brake control cable.

DESCRIPTION OF DRAWINGS

The invention is best understood from the description of embodiments when read in conjunction with the accompanying drawings, which depict illustrative embodiments of the invention.

FIGS. 9A-B depict a dual-state caster apparatus.

FIGS. 10A-10D depict a dual-state caster apparatus in forward motion at various degree of swivel.

FIGS. 11A-11H depict a dual-state caster apparatus in reverse motion at various degree of swivel.

FIGS. 13A, B depicts a front view and an enlarged cross-sectional view, respectively, of a dual-state caster apparatus, wherein the cross-sectional view shows a portion of a braking system with the brake disengaged from the wheel.

FIGS. 14A, B depict a front view and an enlarged cross-sectional view, respectively, of a dual-state caster apparatus, wherein the cross-sectional view shows a portion of a braking system with the braking system engaged with the wheel.

FIGS. 21A, B depict a rear view and side view of an elevating walking chair in a lowered position with the arm rests extended.

FIGS. 23A, B depict a front view of an elevating walker chair and a cross-section of the elevating walker chair, respectively, wherein the cross-section shows a portion of a braking system.

FIGS. 24A-C show a front view of an elevating walker chair, a cross-sectional view through an armrest of the elevating walker chair, and another armrest cross sectional view showing alternate positions of a brake input arm and a brake control lever, respectively.

DESCRIPTION OF EMBODIMENTS

Figure 1:
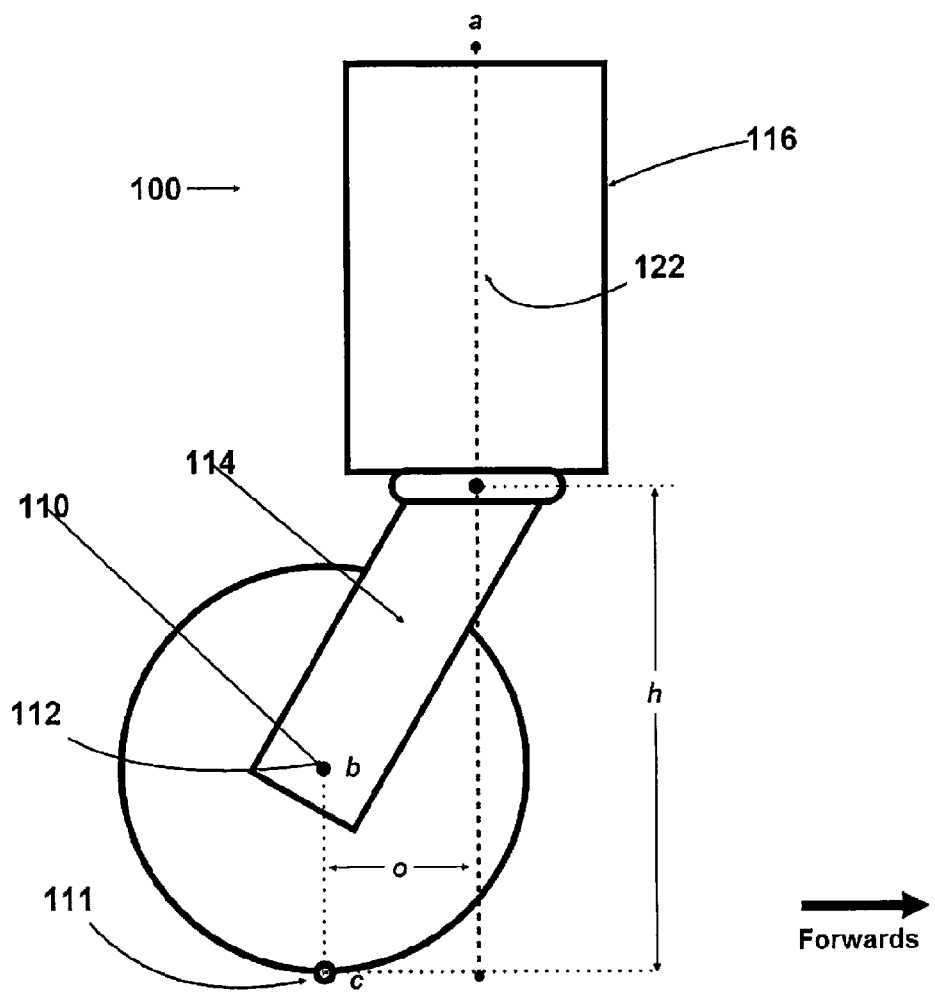
FIG. 1 depicts a conventional caster.

Tilting the angle of a caster head in most cases causes it to tend to steer in a given direction. This effect arises from the fact that when the head angle is vertical, caster rotation does not make the head height rise or fall, but changing the caster head angle makes the caster rotate not about a horizontal plane, but slightly angled to it. This causes the wheel to lift the caster-head (and the attached vehicle) up and down throughout its rotation. If the top of this axis is tilted towards the front of the vehicle, the weight of the vehicle will influence the caster to rotate rearwards because the caster head is then at its lowest position. Correspondingly, the caster will exhibit a tendency to track the vehicle in a forwards direction.

Tilting the caster head angle forwards has the effect of making the casters track forwards effectively. On a four-wheel vehicle, if the front casters are free to rotate around their steering axes, and the rear casters are similarly free but with their heads angled forwards, the vehicle may have the positive characteristics of all three aforementioned combinations, without many of the negative ones. In common with front steering, the vehicle may track in a forward orientation; in common with rear steering, the rear of the vehicle may also be steered to pass through doorways; and in common with four-wheel steering, the vehicle may be maneuvered into or through tight spaces in any orientation. Overall, the vehicle may exhibit a slight tendency to oversteer on cornering, which may be tuned by varying the caster head angle and offset, with a goal that the vehicle's front and rear wheels will at least substantially line up automatically for passing through tight spaces like doorways. Additionally, the more weight on the vehicle, the more the angled casters may wish to track in the desired direction, therefore the effect may scale proportionally to the load.

By way of example, on a vehicle with a wheelbase of 30", wheels of 8" diameter, and offset of 2.5", the caster head angle of the caster begins to cause slight forward tracking when the caster is angled top forwards at 3 degrees, with performance generally improving to about 7 degrees. From 7 degrees upwards, tracking increases, becoming strong at 10 degrees, and heavy at 12 degrees. As the caster head angle increases, maneuverability correspondingly decreases. Increasing the caster head angle also increases the tendency of the caster to shimmy, requiring caster heads tilted at higher angles to have increasing amounts of steering-head damping, to the point where the tracking effect may no longer be useful, as increased damping further decreases maneuverability.

The effect may be scaled to work with differing wheel sizes and wheelbases by altering the steering axis angle from a vertical line to the surface on which the wheel travels, for example, between 3-15 degrees, and the caster offset independently, permitting angled caster tracking to be effective in different sizes of vehicle and types of wheels, over a variety of types of surface. Illustrative caster steering axis angle ranges are about 3°-15°; about 5°-10°; and about 6°-8°. Illustrative offset ranges are about 1 inch-5 inches; 2 inches-4 inches; and about 2.5 inches-3.5 inches. As the wheelbase, i.e. the distance between a front set of wheels and a rear set of wheels, increases, the smaller the optimum steering axis angle from the vertical. By "optimum" steering axis angle it is meant the angle at which performance is at a peak, such as when the wheels go from a forward position to a reverse position with relatively little force.

Casters having angled steering axes according to the embodiments described above, may still resist backing up, and may be unstable in this condition, because the caster head, and the attached vehicle, is raised to a higher position. When reversing, such a vehicle may steer unbidden to a direction that allows the casters to rotate so as to lower the vehicle relative to the ground.

However, if the caster head angle itself is substantially free to pivot from the angled state to the normal vertical state, backing up causes the head angle to change from angled to vertical. A vehicle fitted with these 'dual-state' casters may thus behave in an improved manner. It may have the advantages of rear-fitted angled casters, and without the disadvantages, as backing up causes the head angle to change state to the vertical orientation, thus in essence 'disabling' tracking, and subsequent forward motion causes the caster to pivot back into the angled, tracking state. The term "vertical" as used herein may not be exactly plumb or exactly perpendicular to the horizon. Instead the term means vertical or near vertical (also referred to as "approximately vertical" or "about vertical," or the like), to take into account construction tolerances and the levelness of the terrain on which the apparatus is positioned. Similarly, the term "horizontal" may not indicate true horizontal.

Henceforth in this document, the angle of rotation of the caster will be notated in a system of polar coordinates, where zero degrees is defined as the position of the caster when the attached vehicle is traveling in a forward direction with the offset and consequently the wheel pointing in the rearward direction; and +/−180 degrees is defined to be the position of the caster when the attached vehicle is traveling in a rearward direction with the offset and consequently the wheel pointing in the forward direction. Since caster performance is independent of direction of rotation, only a hemisphere of 180 degrees will be considered.

The handling characteristics of dual-state caster-angle tracking are dependent, at least in part, on the pivot position of the caster angle. It is demonstrable that state change of the caster angle tends to occur when the contact patch of the tire on the ground is directly below a transverse horizontal line that intersects the pivot axes of the rear casters. In one embodiment, the position of this axis is directly above the contact patch when the caster is in its angled state, and rotated approximately 90 degrees from its forward-travel position. This pivot position allows for caster-angle tracking to be relatively stable to 90 degrees on either side of forward travel. With casters in this angled state, a vehicle will generally tend to track in the forward direction, and will generally recover this forward tracking even when the vehicle is pushed sideways. When pushed in a rearward direction outside of this 180 degrees or both free swivel arc as described elsewhere herein, state change will occur, and tracking due to the angled steering axis will be 'disabled', allowing the vehicle to be moved in substantially any rearward direction with little or no tracking.

For most configurations, a pivot position forward of the tire's contact patch with the ground, will favor the caster's pivoting to its angled state, whereas a pivot position behind the contact patch will tend to favor the caster's pivoting to its vertical state. Therefore state change occurs when the pivot axis is above the tire contact patch. Additionally, in changing from the angled to the vertical state—as the contact patch remains in substantially the same position on the ground—the vehicle moves slightly rearward bringing the pivot axis rearward with it. As the pivot axis moves rearward, this position now favors the caster angle remaining in its vertical state. A vehicle with its rear casters in the vertical state may therefore steer relatively freely over a range greater than 180 degrees to rearward (the exact arc being determined by the caster offset). This may allow, for example, an occupant seated in such a vehicle to push away from a work-surface, move relatively freely sideways, then return to the work-surface at a different position with little or no risk of tracking being engaged during sideways, or slight forwards, motion. Only when the vehicle is moved a threshold amount in the forward direction will the casters change back to the angled state.

The height of the caster pivot axis above ground also affects how state change occurs. A low position, close to the top of the wheel, allows state change to occur with little effort, whereas a higher position requires greater effort. Additionally, the higher the position of the pivot axis, the greater the change in wheelbase length throughout the change. For these reasons, for most purposes pivot axis height should ideally be low. An illustrative range is within one wheel diameter above the top of the wheel. When state change is desired to be achieved less easily, or if it is preferable to change the wheelbase between state changes, a higher position of between 2-3 wheel diameters may be used.

FIG. 1 depicts a conventional caster 100 having a wheel 110 that steers about a horizontal steering axis a 112. The forward direction of the caster is indicated on the diagram by an arrow. A fork 114 is attached to an axle that extends between pivot 112 and an opposing pivot (not shown). A caster head 116 extends from fork 114. Fork 114 pivots with respect to caster head 116 about a vertical axis 122, which will be referred to as a "steering axis." Thus, conventional casters, whether of the type shown or otherwise, have the common features of a wheel that rotates about a horizontal axis and a caster head that allows the wheel to steer about a vertical axis. The vertical rotational axis through a center a of caster head 116 is offset by a distance o from a vertical line running through pivot 112, i.e., or the center b of wheel 110 and tire contact patch c 111 with the ground. The perpendicular distance between the vertical lines through points a and b is the offset o for conventional casters. In addition to using the term "offset" as a distance, the term will be used to describe a line or component spanning the offset distance, for example, by referring to the offset rotating, trailing, etc.

Caster head 116 is a certain height h above the ground. As the caster rotates around its steering axis, h remains constant, because the offset is rotating in a horizontal plane. In this condition, the caster will steer freely in all directions, with its offset trailing behind the steering axis.

Figure 2:
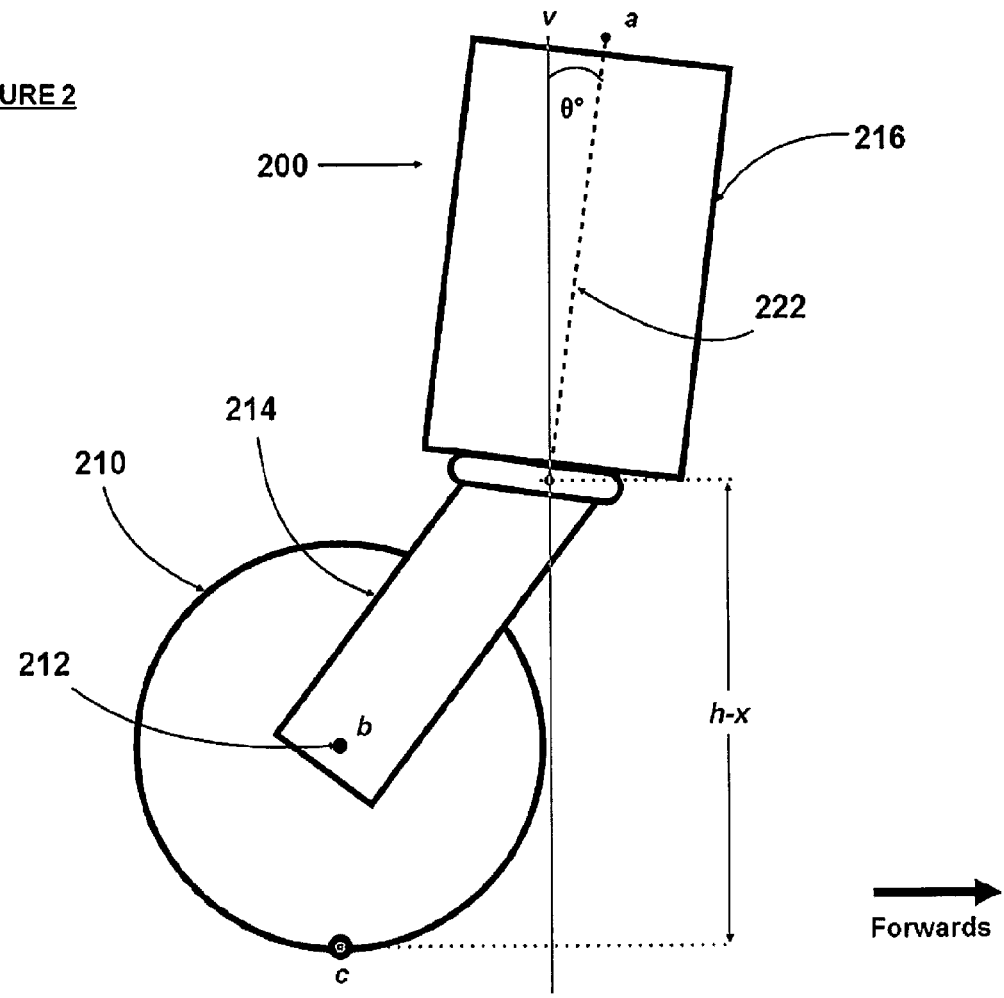
FIG. 2 depicts an illustrative embodiment of an angled caster

FIG. 2 depicts an illustrative embodiment of an angled caster 200, in which unlike conventional casters, the steering axis is tilted from the vertical v. The forward direction is indicated on the diagram by an arrow. Wheel 210 pivots about a horizontal axis at pivot 212. A fork 214 is attached to an axle that extends between pivot 212 and an opposing pivot (not shown). A caster head 216 extends from fork 214. Fork 214 pivots with respect to caster head 216 about a non-vertical steering axis 222. Steering axis 222 is angled $\theta$ degrees to the vertical. The caster offset for this caster configuration is the perpendicular distance from the non-vertical steering axis to the center b of the wheel. Because the offset is no longer rotating in a horizontal plane, but angled to it, height h is no longer constant, but varies throughout the caster rotation. In the orientation shown in FIG. 2, the center a of the caster head 216 is now lower than height h by an amount x. (This amount is determined by the formula $x = \sin\theta \times o$, where x is the lift distance from ground level, $\theta$ is the head angle, and o is the offset.) So in this configuration, wheel 210 is subjected to a "lifting force" as it is rotated about non-vertical steering axis 222, i.e. as it goes from forward motion to reverse motion, because of the tilt in steering axis 216.

Figure 3:
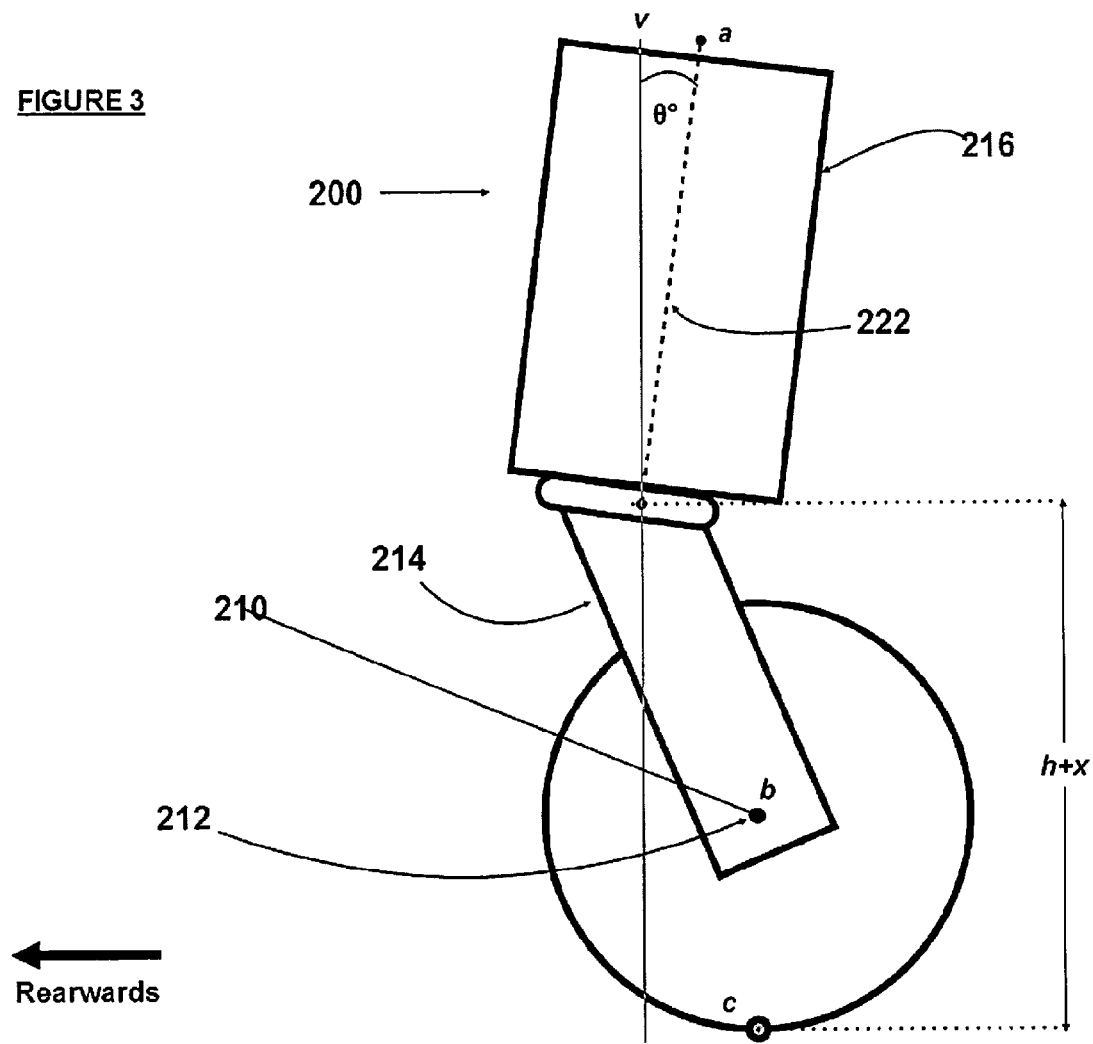
FIG. 3 shows an angled caster travelling in a direction opposite to that which is shown in FIG. 2

FIG. 3 shows angled caster 200 travelling in a direction opposite to that which is shown in FIG. 2, with its offset trailing behind steering axis 222 at 180 degrees (measured around the steering axis) to its position as shown in FIG. 2. Center a of caster head 216 is now higher than height h by an amount x. The total change in height is 2x.

Correspondingly, angled caster 200 will typically show a tendency to steer in the direction indicated in FIG. 2, because for it to rotate to the position shown in FIG. 3, it must raise caster head 216, and the attached vehicle, farther from the ground. Such steering bias will be referred to as "tracking", because such casters fitted to a vehicle, while allowing it to steer in any direction, will cause that vehicle to preferentially steer, or track, in a desired direction. The amount of tracking is affected by the caster angle and offset. The size of the contact patch on the ground, and steering-head friction will also affect tracking, but typically to a lesser extent. Wheel diameter itself will not change the effect significantly, since the tire contact patch is vertically below the wheel axle, but as the contact patch increases in length, the effective offset will decrease. High-speed artefacts, such as the gyroscopic effect, can also be relevant.

Angled caster 200 may exhibit unstable steering when pushed in the direction shown in FIG. 3 (henceforth called the rearward travel orientation). This is because caster head 216, and the attached vehicle, is at its highest point in the rotation, causing the offset to tend to steer away in either direction towards its preferred forward travel orientation. Although a vehicle fitted with one or more of these angled casters may track well in the forward direction, it will likely prove difficult to maneuver sideways and rearwards.

Figure 4:
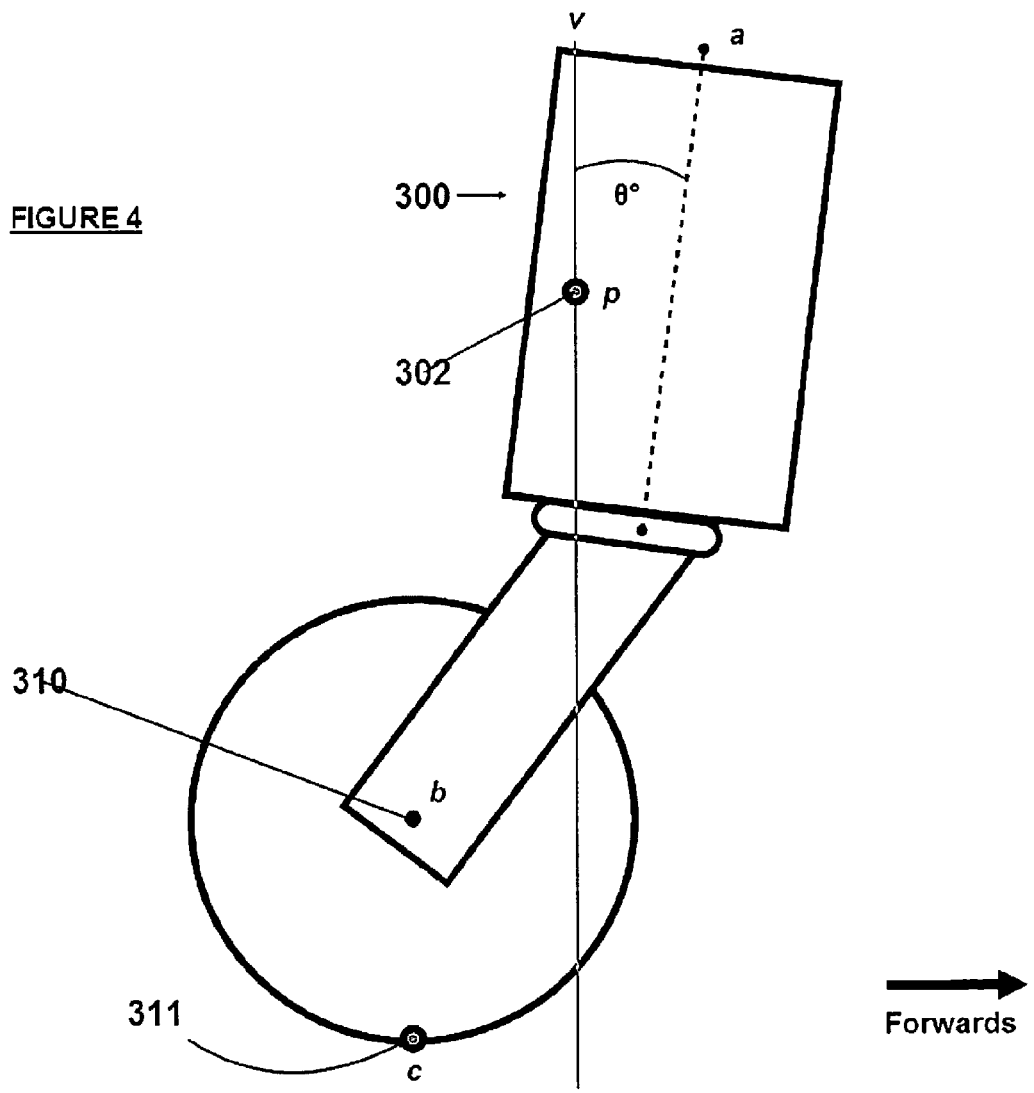
FIG. 4 shows a dual-state angled caster that is fitted with a state-change pivot that allows the caster to change between its angled state and a vertical one.

FIG. 4 shows a dual-state angled caster 300 that is fitted with a state-change pivot p 302 that allows the caster to change between its angled state and a vertical one. When the caster is in the forward travel orientation shown with the offset pointing wheel 310 to the rear, state-change pivot 302 should be positioned forward of the tire contact patch c 311 of wheel 310 for the caster to be stable in the angled state.

Figure 5:
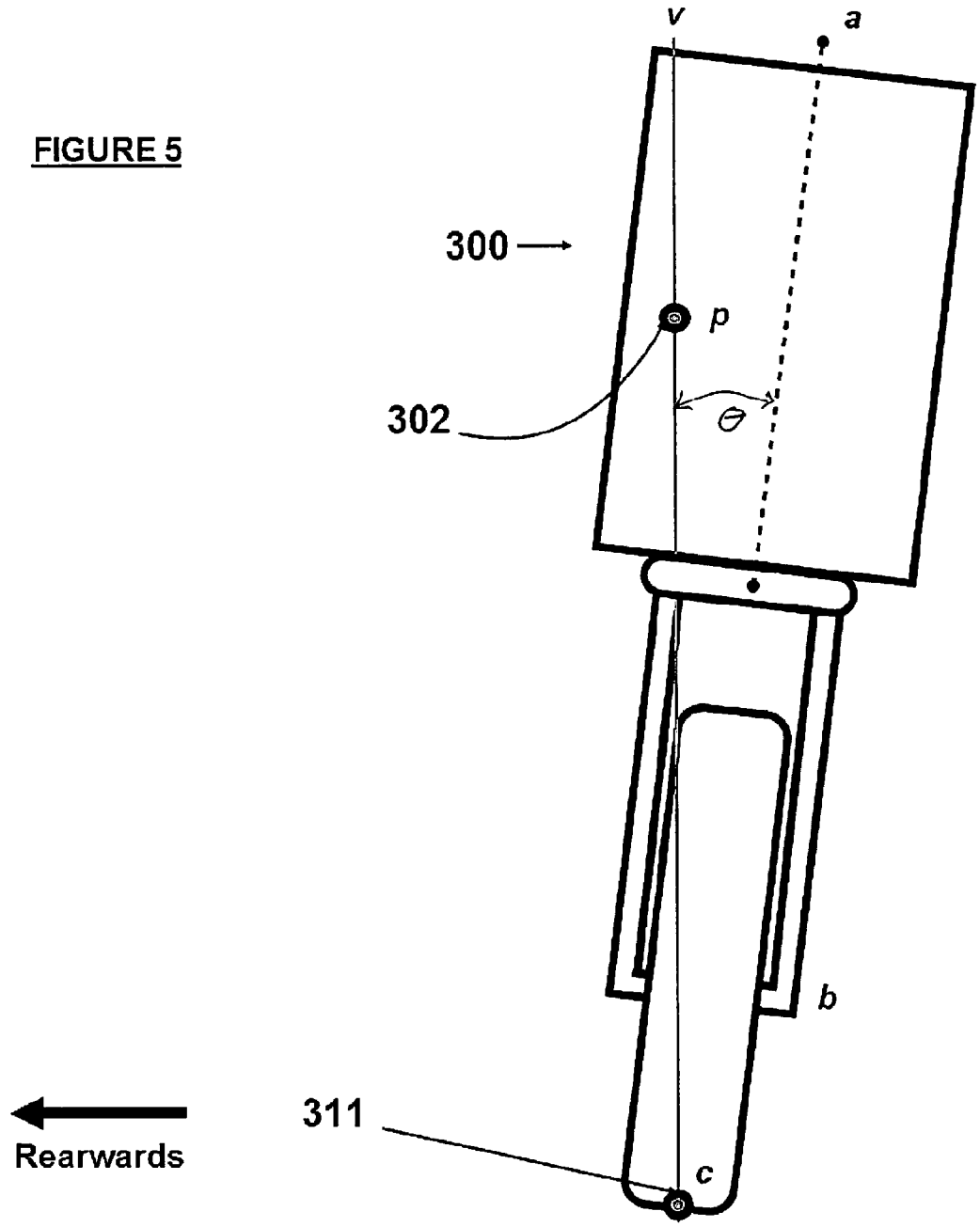
FIG. 5 shows a dual-state angled caster with its offset rotated 90 degrees from that shown in FIG. 4.

FIG. 5 shows dual-state angled caster 300 with its offset rotated 90 degrees from that shown in FIG. 4. In one embodiment, the position of pivot axis p 302 may be placed at a selected point along the vertical line that intersects the tire contact patch c 311 on the ground when the offset is rotated 90 degrees from the forward travel orientation, and the caster is in its angled state, as shown. When pushed rearwards, this caster will rotate 90 degrees, at which point the tire contact patch c 311 is directly underneath the pivot axis: state change to vertical is about to occur. Thus, an optimum balance between forward tracking and rearward maneuverability may be achieved at approximately 90 degrees. Accordingly, in an exemplary embodiment the state-change pivot is on a vertical line above the contact patch when the wheel rotated to a position that is approximately or at 90 degrees from a forward travel position when the steering axis is angled from the swivel axis. Illustrative ranges of the angular wheel position include 45 degrees to 135 degrees; and 75 degrees to 105 degrees.

Figure 6:
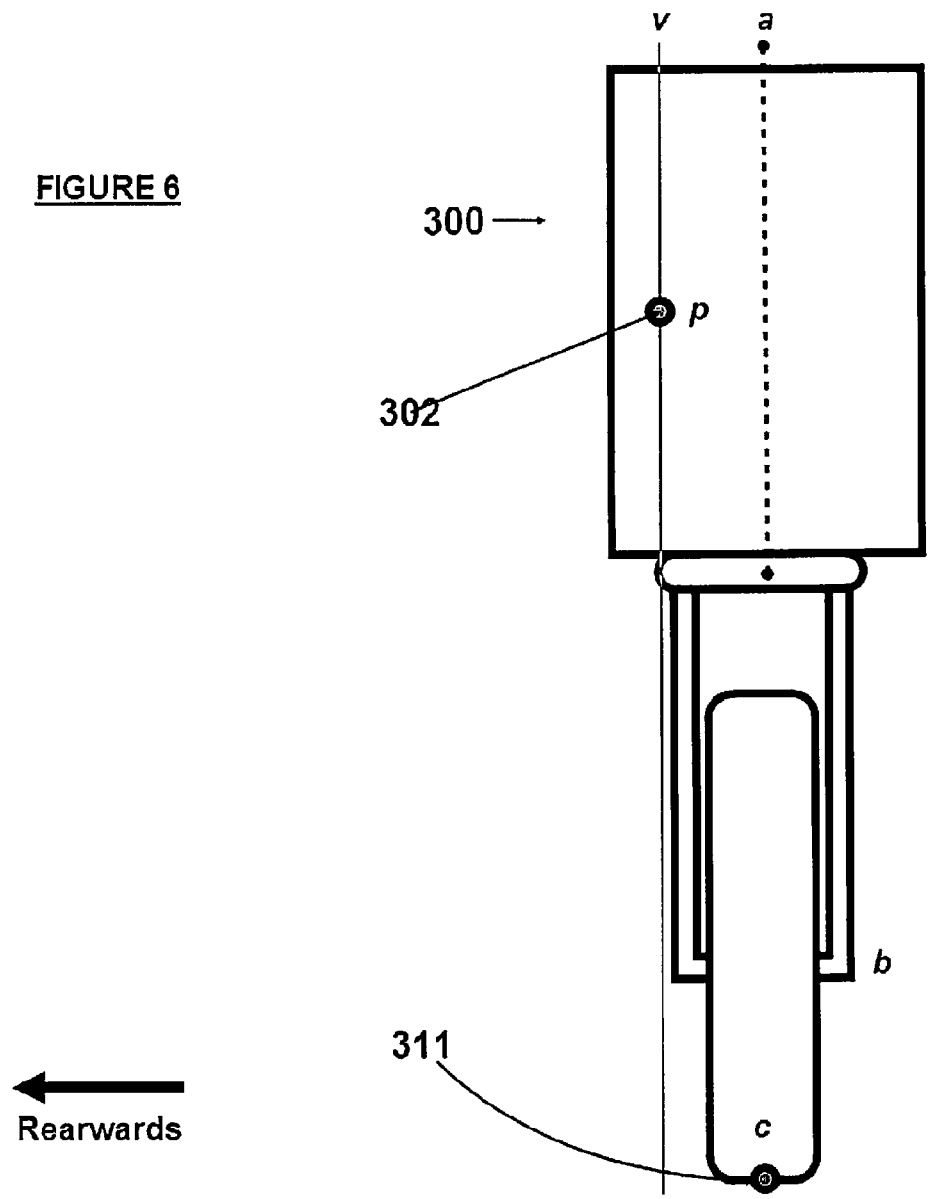
FIG. 6 depicts a dual-state angled caster after a state change to vertical.

FIG. 6 depicts dual-state angled caster 300 after state change to vertical. During the state change from angled to vertical, the contact patch remains substantially at the same position on the ground while the caster rotates around that point. This causes the caster pivot axis p 302 to move rearwards relative to the tire contact patch c 311, so after the state change, this state is stable.

Figure 7:
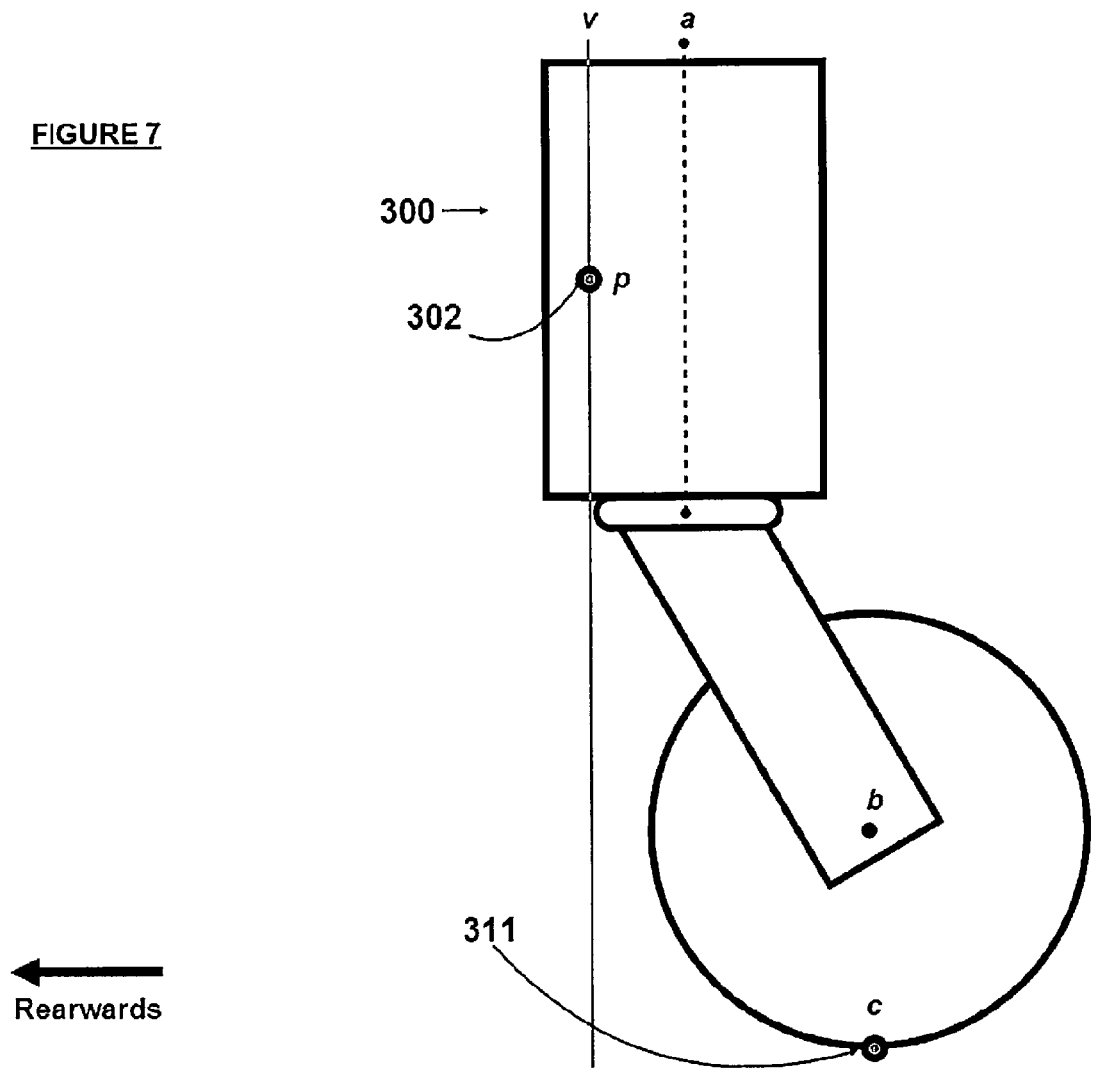
FIG. 7 shows dual-state angled caster in its vertical state.

FIG. 7 shows dual-state angled caster 300 in its vertical state. In this orientation, the caster exhibits little or no preferred steering, or tracking, direction, so an attached vehicle will be relatively free to steer in any rearward direction.

Figure 8:
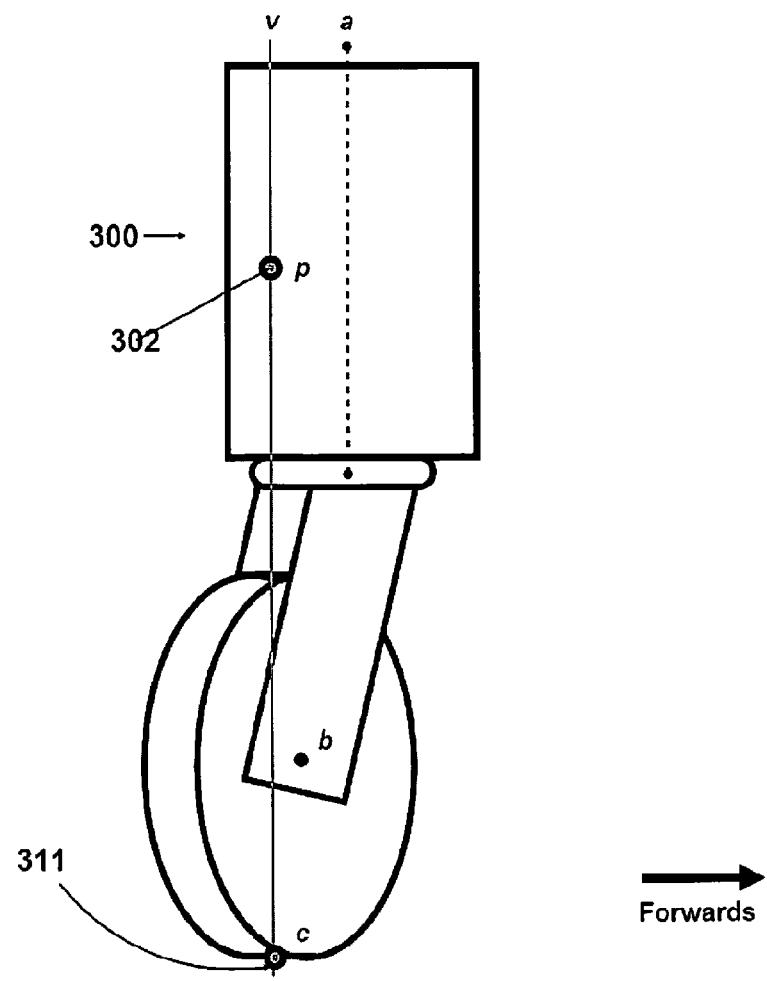
FIG. 8 shows a dual-state angled caster being pushed forwards and in its vertical state.

FIG. 8 shows dual-state angled caster 300 still in its vertical state, but now being pushed forwards. Any further forward motion will cause the caster to change back to its angled state. Unlike in FIG. 5, the caster offset is rotated by more than 90 degrees to its rearward direction. This means the caster will remain free steering over an arc greater than 180 of this rearward direction. As used herein, "free steering" refers to a caster apparatus having the swivel axis coincide with vertical. When the apparatus is not "free steering" it is biased toward moving in a particular direction. Although always in excess of 180 degrees, the exact arc is determined by the extent of the offset o.

FIGS. 9A-B depict an illustrative dual-state caster apparatus 400 embodying caster features described above. FIG. 9A shows a front view of dual-state caster apparatus 400 and FIG. 9B depicts a forward motion side view of dual-state caster apparatus 400. Dual-state caster apparatus 400 has a wheel 410 that rotates about a horizontal axis at pivots 430, 432. Fork 414 is attached to an axle through the pivots. A caster head 416 is attached to fork 414 and cart frame 426 and provides rotation about a non-vertical steering axis. Caster head 416 comprises an upper pivot component 418 and a lower housing 420. Upper pivot component 418 pivots rearward and forward about state-change pivot 422. Upper pivot component 418 and lower housing 420 are not flush with one another at their interface 424. Instead, as can be seen in FIG. 9B, there is a gap along a portion of interface 424 that allows upper pivot component 418 to rotate about state-change pivot 422 until upper pivot component 418 comes into contact with housing 420. As upper pivot component 418 pivots about state-change pivot 422, a gap opens opposing the gap shown in FIG. 9A. Other structural configurations and mechanisms that allow rotation about pivot state-change 422 and provide a limit to the amount of rotation can also be used, such as a housing fixed to lower housing 420. Caster head 416, thus, may be positioned vertically or at non-vertical angles leaning in the opposite direction of travel, for example.

FIGS. 10A-10D depict dual-state caster apparatus 400 in forward motion at various degree of swivel. FIGS. 10A, 10B depict forward motion of dual-state caster apparatus 400 wherein fork 414 has swiveled 45 degrees with respect to housing 420. FIG. 10A depicts a rear view of dual-state caster apparatus 400, wherein reverse motion is into the page. FIG. 10B shows a side view of dual-state caster apparatus 400 in forward motion to the right as shown by the directional arrow. FIGS. 10C, 10D depict forward motion of dual-state caster apparatus 400 wherein fork 414 has swiveled 90 degrees with respect to housing 420. FIG. 10C depicts a rear view of dual-state caster apparatus 400, wherein motion is into the page. FIG. 10D shows a side view of dual-state caster apparatus 400 in forward motion to the right as shown by the directional arrow.

FIGS. 11A-11H depict dual-state caster apparatus 400 in reverse motion at various degree of swivel. FIGS. 11A, 11B depict reverse motion of dual-state caster apparatus 400 wherein fork 414 has swiveled 90 degrees with respect to housing 420. FIG. 11A depicts a rear view of dual-state caster apparatus 400, wherein reverse motion is out of the page. FIG. 11B shows a side view of dual-state caster apparatus 400 in reverse motion to the left as shown by the directional arrow. FIGS. 11C, 11D depict reverse motion of dual-state caster apparatus 400 wherein fork 414 has swiveled 135 degrees with respect to housing 420. FIG. 11C depicts a rear view of dual-state caster apparatus 400, wherein reverse motion is out of the page. FIG. 11D shows a side view of dual-state caster apparatus 400 in reverse motion to the left as shown by the directional arrow. FIGS. 11E, 11F depict reverse motion of dual-state caster apparatus 400 wherein fork 414 has swiveled 180 degrees with respect to housing 420. FIG. 11E depicts a rear view of dual-state caster apparatus 400, wherein reverse motion is out of the page. FIG. 11F shows a side view of dual-state caster apparatus 400 in reverse motion to the left as shown by the directional arrow. FIGS. 11G, 11H depict reverse motion of dual-state caster apparatus 400 wherein fork 414 has swiveled 180 degrees with respect to housing 420. FIG. 11A depicts a rear view of dual-state caster apparatus 400, wherein reverse motion is out of the page. FIG. 11B shows a side, sectional view through section F-F of FIG. 11G of dual-state caster apparatus 400 in reverse motion to the left as shown by the directional arrow.

Figure 12A:
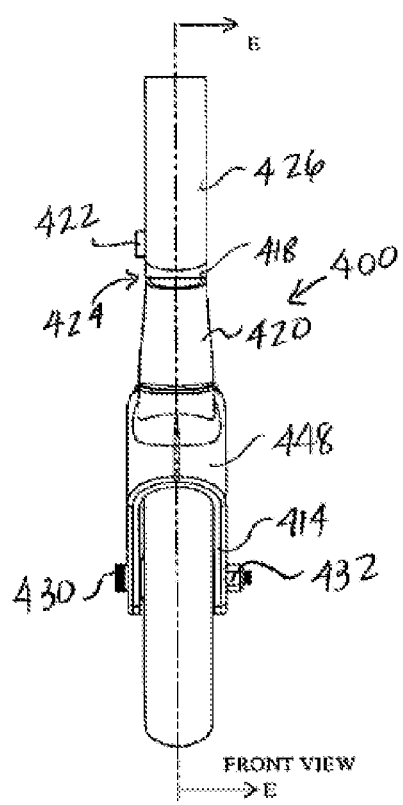
FIGS. 12A, B are a front view and an enlarged cross-sectional view, respectively, of a dual-state caster apparatus, wherein the cross-sectional view shows a portion of a braking system.
Figure 12B:
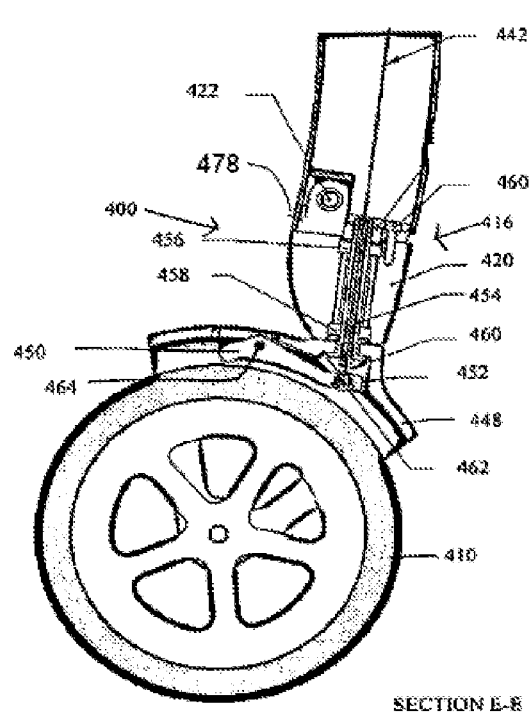

FIGS. 12A-12B, 13A-13B and 14A, 14B depict dual-state caster apparatus 400 showing a braking system 440. FIG. 12A is a front view of dual-state caster apparatus 400. FIG. 12B is a cross-section taken through section E-E of FIG. 12A. FIG. 12B shows caster head 416 comprising upper pivot component 418 and lower housing 420. Upper pivot component 418 rotates with respect to lower housing 420 about state-change pivot 422. Upper pivot component 418 and lower housing 420 are not flush with one another at interface 424 to allow upper pivot component 418 to pivot about state-change pivot 422.

Braking system 440 includes brake control cable 442 disposed through cart frame 426, and further through an opening 444 in a swivel pivot axle 454 in lower housing 420, and still further through an opening 446 in a wheel faring 448. Brake control cable 442 is anchored in brake lever 450 via a brake cable swivel bearing 452. Brake control cable 442 is disposed within a compression spring 460 extending above brake lever 450. Brake control cable 442 may be threaded through, and attached to, the caster apparatus in any manner that allows it to function as a brake control cable by arresting motion of wheel 410 and still assure it will not interfere with the caster functions, and the caster functions do not interfere with the braking action.

Rotation of lower housing 420 about swivel pivot axle 454 is facilitated by upper ball bearings 456, lower ball bearings 458 and inner swivel race 462. Securing screw 168 fixes upper pivot component 418 to lower housing 420.

When brake control cable 442 is pulled away from wheel 410, brake lever 450 rotates about brake pivot 464, thereby engaging with wheel 410 and slowing or arresting rotational motion. Compression spring 460 is compressed when brake control cable 442 is pulled away from wheel 410. When brake control cable is released, compression spring 460 expands to its natural position, which rotates brake lever 450 about brake pivot 464 back to a position that releases force on, or friction with, wheel 410.

FIG. 13A depicts a front view of dual-state caster apparatus 400, FIG. 13B is a cross sectional diagram taken through section G-G of FIG. 13A. FIG. 13B shows spring 460 in its natural expanded state. Brake lever 450 is thus not engaged with wheel 410.

FIG. 14A depicts a front view of dual-state caster apparatus 400. FIG. 14B is a cross sectional diagram taken through section H-H of FIG. 14A. FIG. 14B shows spring 460 in in a compressed state indicating that brake control cable 442 has been pulled away from wheel 410. This rotate brake lever 450 to engage with wheel 410, and thus creates a braking effect.

Figure 15:
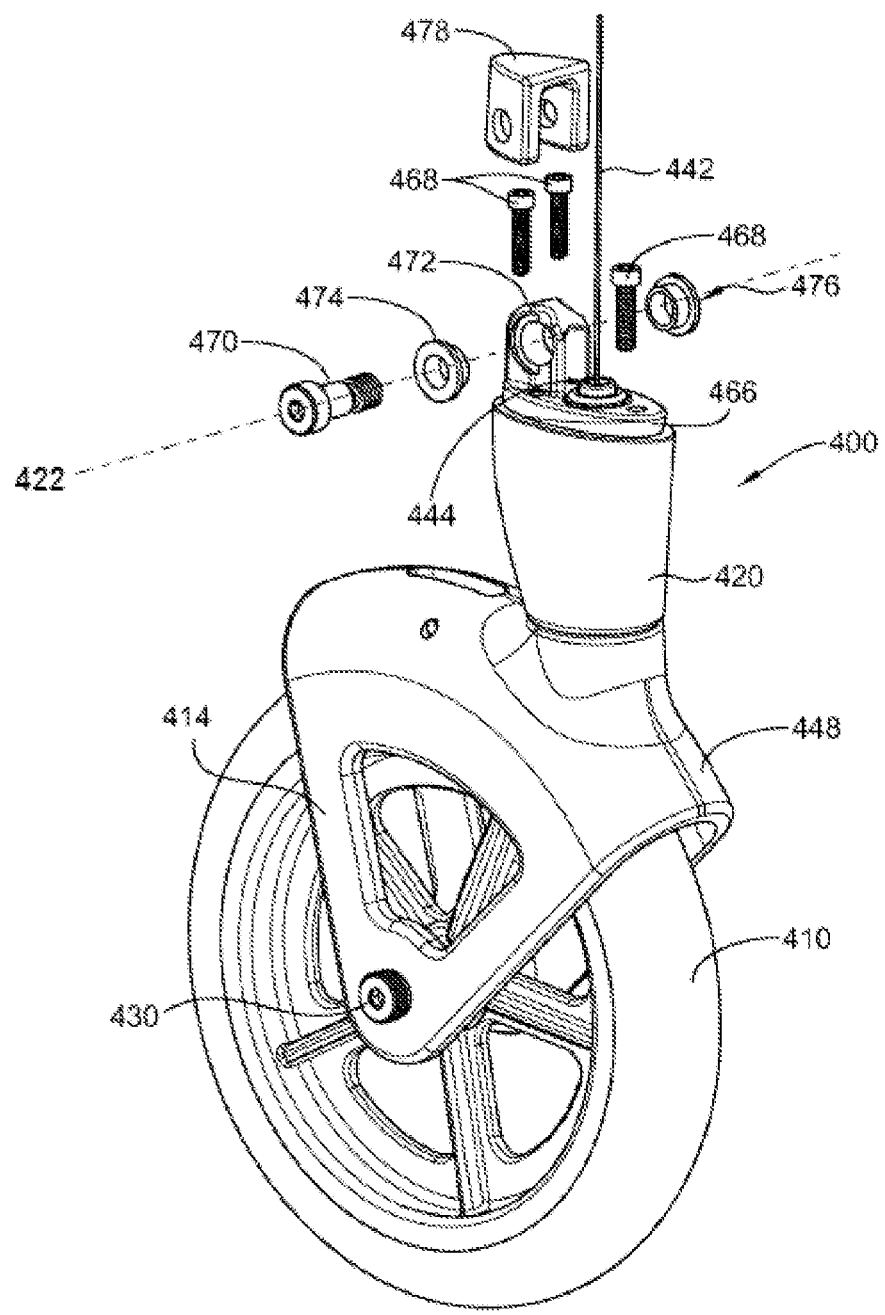
FIG. 15 is a partially exploded view of components connected to a lower housing and a component of upper pivot component

FIG. 15 is an exploded view of upper pivot component 418. An upper pivot component base 466 of upper pivot component 418 is seated in lower housing 420. One or more screws 468 secure upper pivot component base 466 to lower housing 420. A pivot frame mount 478 fits over a state pivot support 472. A state pivot bolt 470 extends through state pivot support 472, a first state pivot bushing 474, and a second state pivot bushing 476. Brake control cable 442 extends through opening 444 in lower housing 420. FIG. 15 further shows wheel faring 448 and fork 414.

Figure 16:
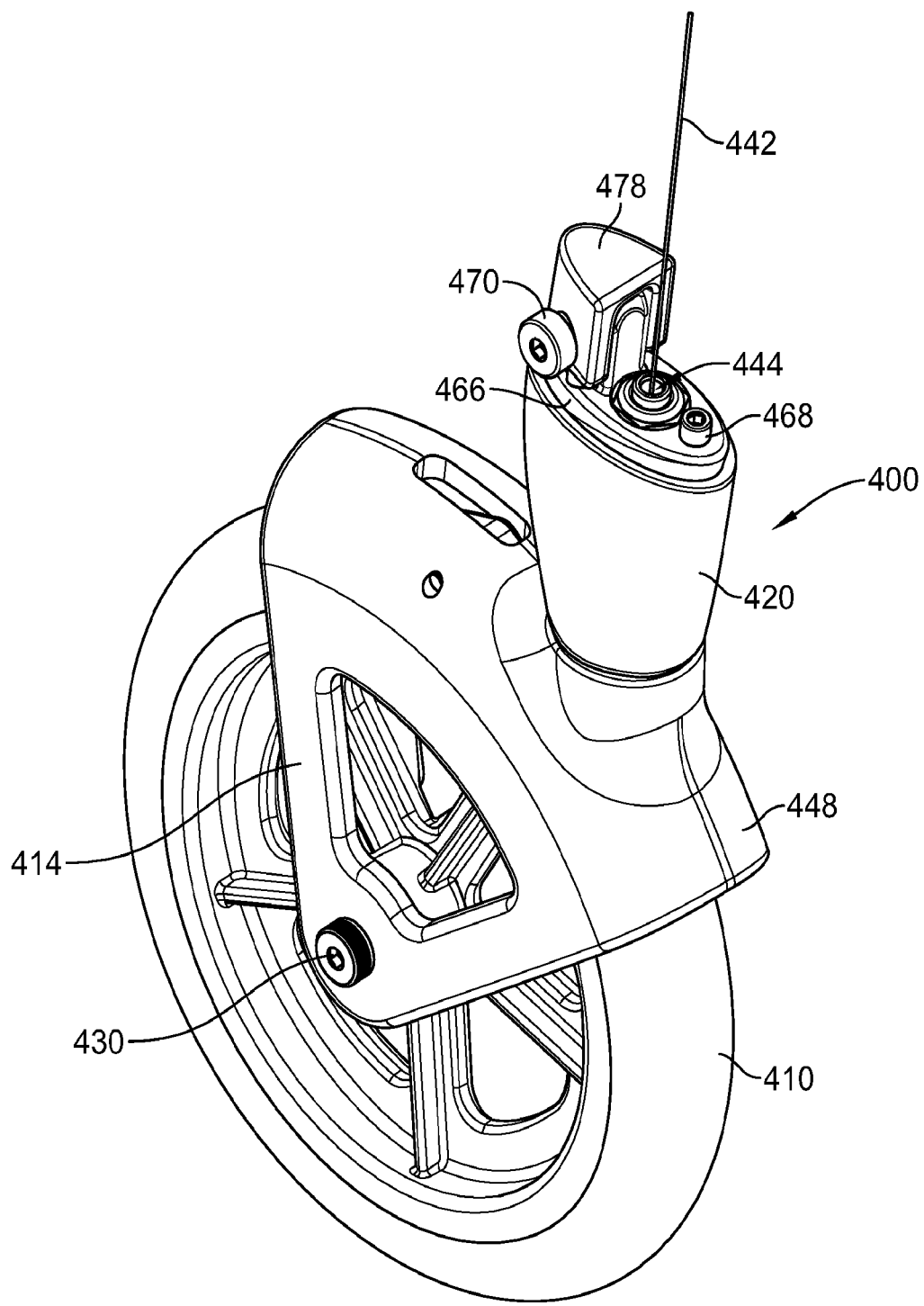
FIG. 16 depicts a caster head of a dual-state caster apparatus.
Figure 17:
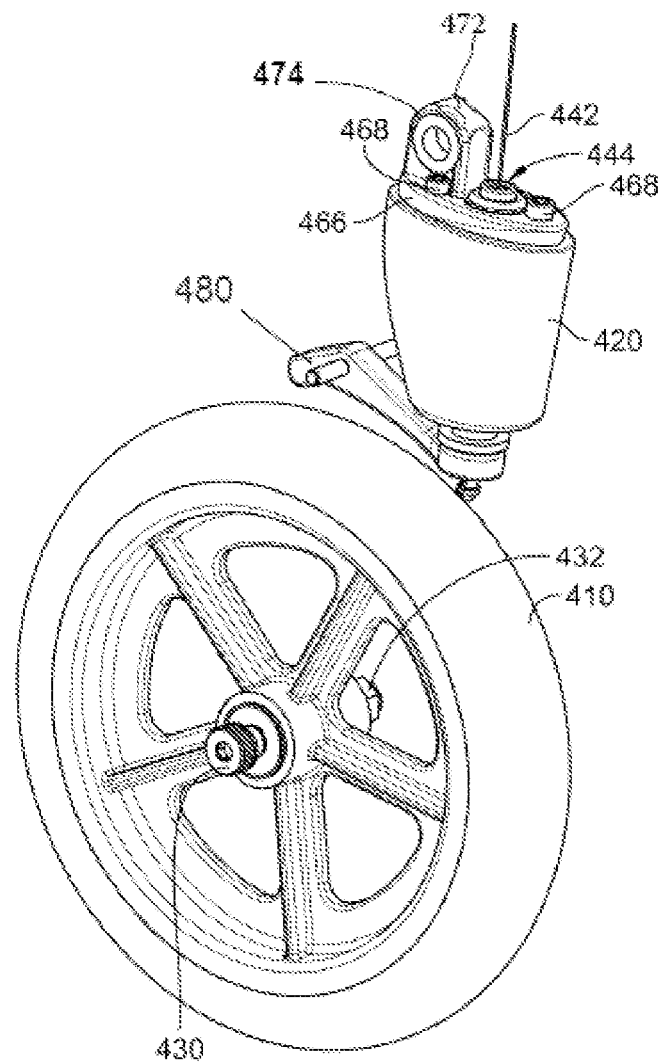
In FIG. 17 a caster head of a dual-state caster apparatus and showing a support for a wheel faring.

FIGS. 16 and 17 depict dual-state caster apparatus 400 with and without the assembly comprising wheel faring 448 and fork 414, respectively. FIG. 16 shows brake control cable 442 disposed through opening 444 in lower housing 420. Also shown are pivot frame mount 478, state pivot bolt 470, and brake control cable 442, disposed through opening 444 in lower housing 420.

In FIG. 17 wheel faring support 480 is visible. Wheel faring support 480 supports wheel faring 448 and provides proper positioning of lower housing 420, and hence caster head 416, with respect to wheel faring 448 and fork 414.

Figure 18:
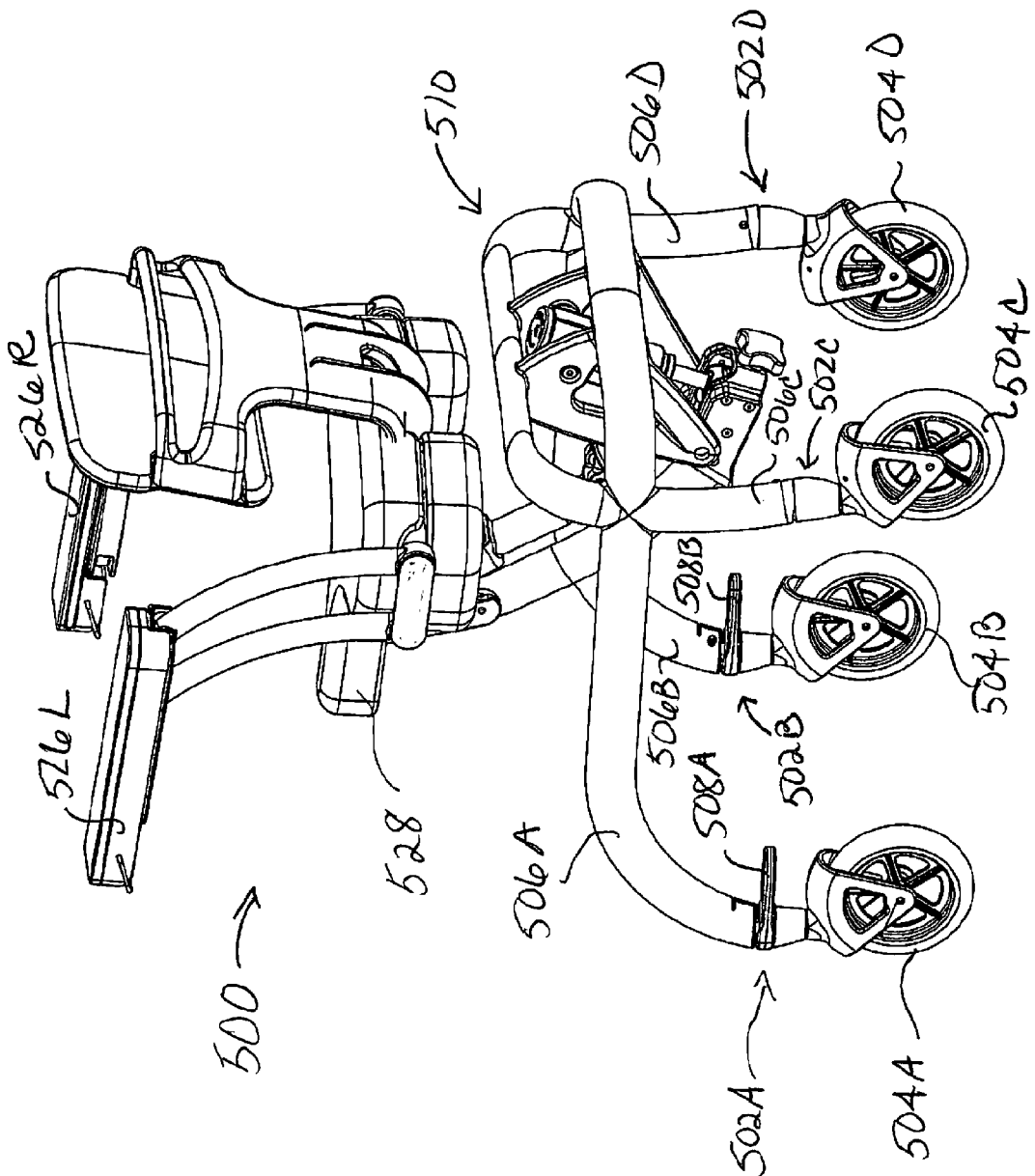
FIG. 18 depicts dual-state caster apparatuses employed on an elevating walker chair.

FIG. 18 depicts an illustrative application of dual-state caster apparatus 400. FIG. 18 depicts an elevating walking chair 500. Elevating walking chair 500 has dual-state caster apparatuses 502A-502D connecting wheels 504A-504D, respectively to frame components 506A-506D, respectively.

Footrest 508A is shown disposed between dual-state caster apparatus 502A and frame component 506A. Footrest 508B is shown disposed between dual-state caster apparatus 502B and frame component 506B. Footrests 504A, 504B are optional and can be incorporated into elevating walking chair 500 with other component configurations. Frame components 506A-506D may also be configured differently. Footrests, frame 510 and its components, such as frame components 506A-D, and other elevating walker chair components may vary provided they serve the intended function of allowing a user to be seated in the chair or use it as a support to ambulate on the user's own leg power, in varying seat heights.

FIG. 18 shows four dual-state caster apparatuses 502A-502D, two front dual-state caster apparatuses 502A, 502B and two rear dual-state caster apparatuses 502C, 502D. It is possible to incorporate dual-state caster apparatuses 502 in only the front positions or only the rear position. A single, either form to rear dual-state caster apparatuses 502 is also possible.

Figure 19:
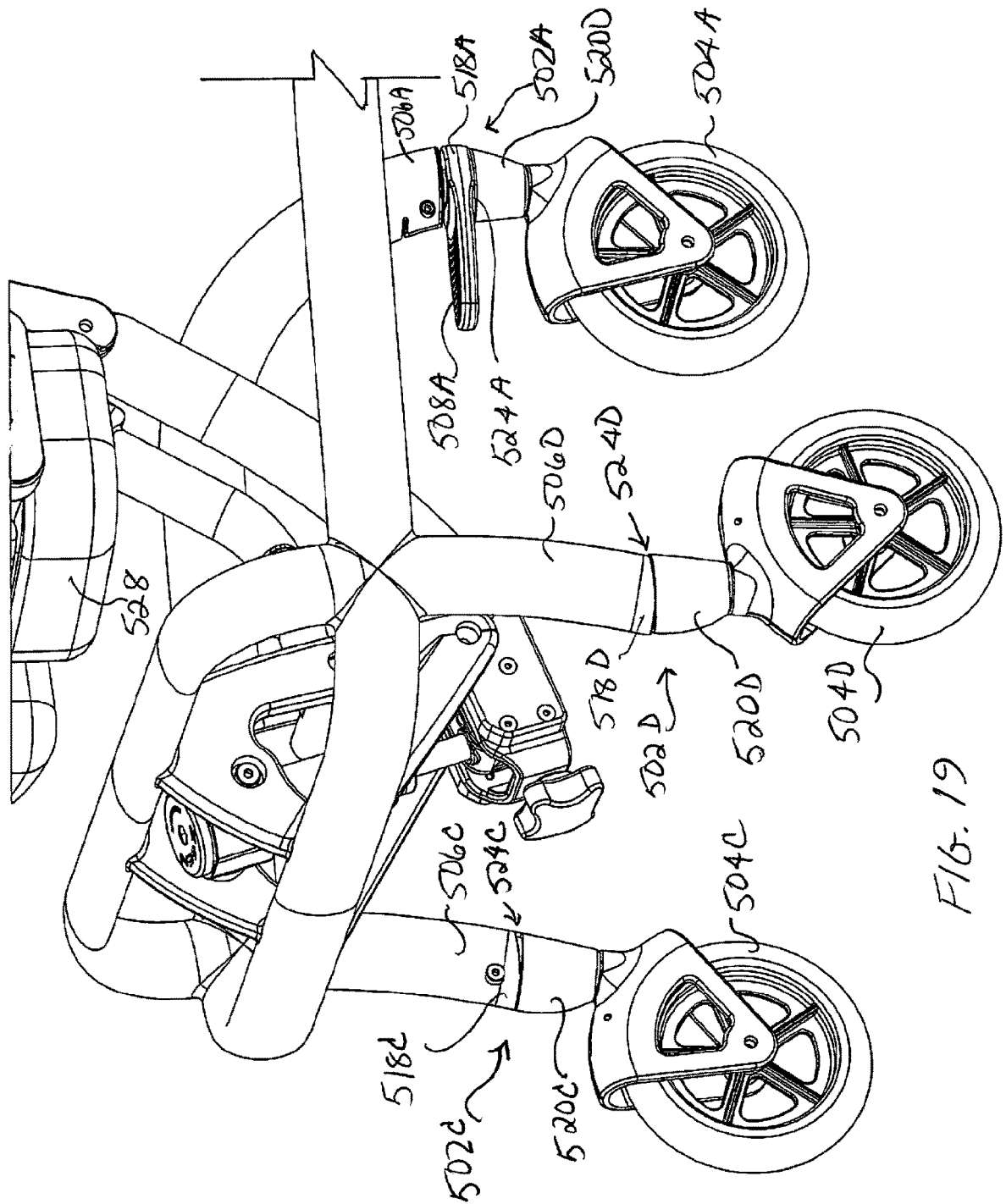
FIG. 19 is a close up perspective view of a portion of an elevating walking chair with dual-state caster.

FIG. 19 is a close up perspective view of a portion of elevating walking chair 500. Each dual-state caster apparatus 502A, 502C, 502D has a lower housing 520A, 502C, 502D attached to an upper pivot component 518A, 518C, 518D at interfaces 524A, 524C, 524D, respectively. It is noted that interface 524A includes footrest 508A position between lower housing 520A and upper pivot component 518A.

Figure 20B:
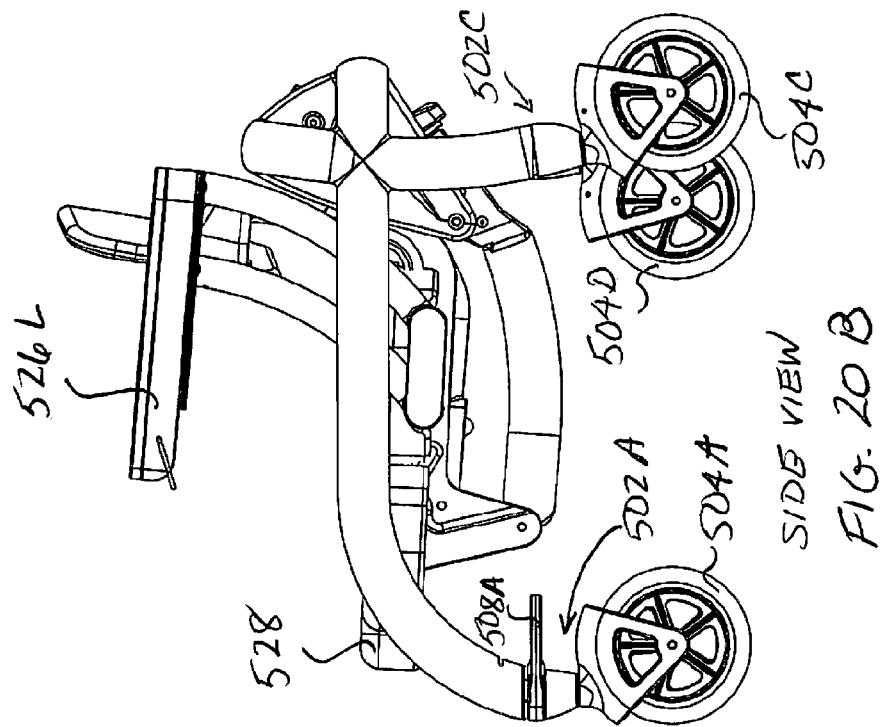
FIGS. 20A, B depict a rear view and a side view of an elevating walking chair in a lowered position with the arm rests retracted.
Figure 20A:
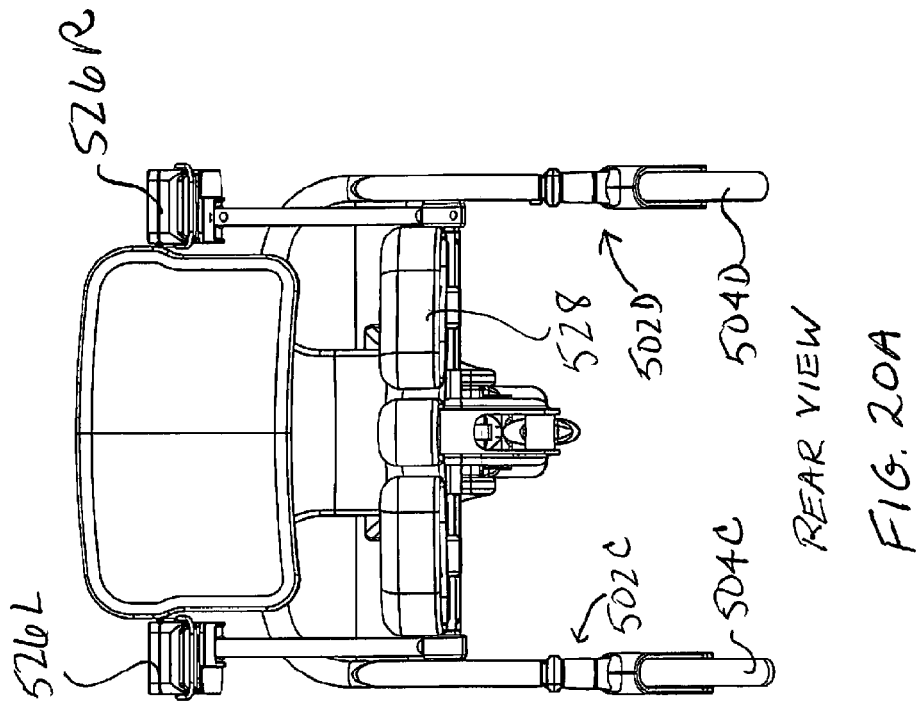

FIGS. 20A, 20B depict two views of elevating walking chair 500 in a lowered position with the arm rests retracted. FIG. 20A is a rear view of elevating walking chair 500 and FIG. 20B is a left-side view of elevating walking chair 500. As used to describe elevating walking chair 500, "left" and "right" are from a user's view when seated in the apparatus. FIGS. 20A, 20B show a seat 524 at its lowest position. Armrests 526R, 526L are in a retracted position.

FIGS. 21A, 21B depict two views of elevating walking chair 500 in a lowered position with the arm rests extended. FIG. 21A is a rear view of elevating walking chair 500 and FIG. 21B is a left-side view of elevating walking chair 500. Seat 524 is at its lowest position. Armrests 526R, 526L are in an extended position.

Figure 22B:
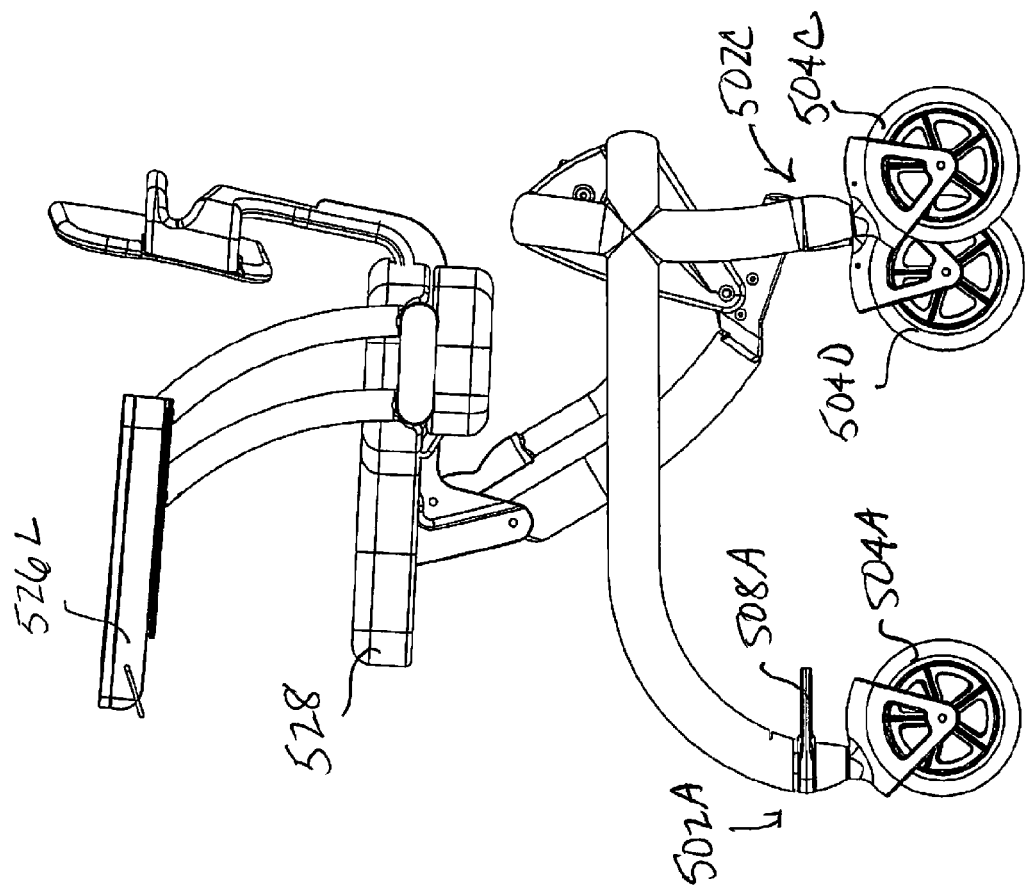
FIGS. 22A, B depict a front view and a side view of an elevating walking chair in a raised position with the arm rests extended.
Figure 22A:
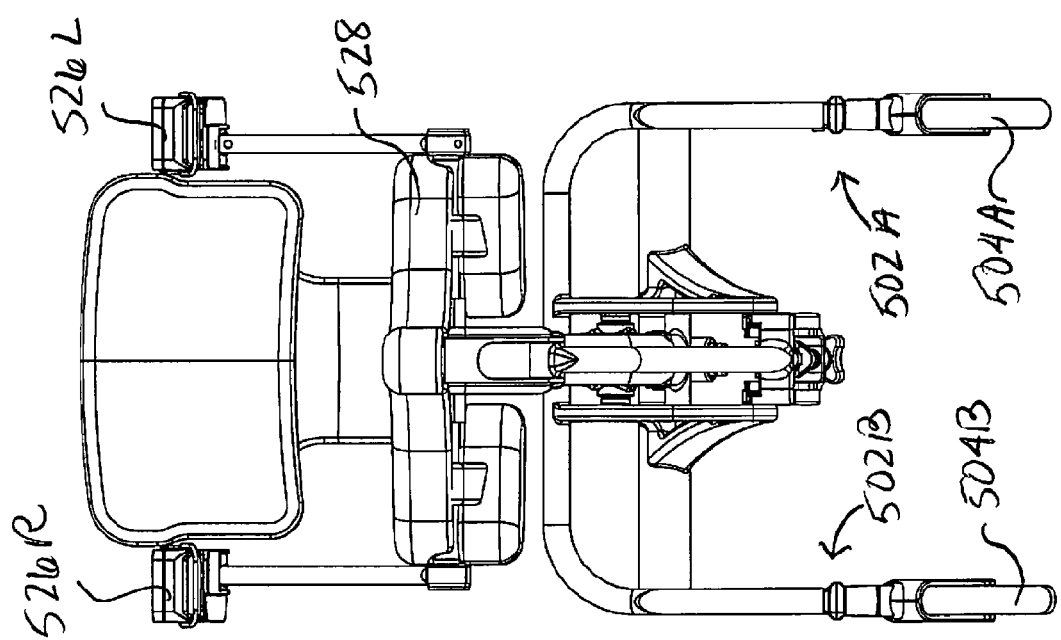

FIGS. 22A, 22B depict two views of elevating walking chair 500 in a raised position with the arm rests extended. FIG. 22A is a front view of elevating walking chair 500 and FIG. 22B is a left-side view of elevating walking chair 500. Seat 524 is at an elevated position as compared to the lowered position shown in FIGS. 20A, 20B and 21A, 21B. Armrests 526R, 526L are in an extended position.

Various other types of carts may include a plurality of the caster apparatuses according to the embodiments described herein. Carts having the dual-state casters may be human propelled or propelled by a motor. In a motorized embodiment, the motor is configured to impart motion to the wheels. An electronic control unit is functionally connected to the motor and configured to impart motion to, and control the direction of, the wheels of the caster apparatuses. The electronic control unit may comprise one or more processors, memory, sensors and computer code executable by the processors to provide desired movement to the cart via the caster apparatuses.

Further illustrative carts include, single or multiple-wheel carts meant to be powered by human or animal means, such as, but not limited to, a shopping cart, pushchair, luggage trolley, wheelchair, flat-bed cart or dolly; and self-propelled carts such as, but not limited to, a walker, wheelchair, or scooter; or any powered vehicle, particularly those for which the steering characteristics may benefit from dual-state angled casters. Embodiments of the invention include the aforementioned apparatuses having one or more casters as described herein. In illustrative embodiments, two or more of the casters are used on any of the embodiments of the elevating walker chair described in U.S. patent application Ser. No. 15/326,113, entitled Elevating Walker Chair, which is incorporated herein by reference.

FIG. 23A is a front view of an elevating walker chair 600 having a braking system, and having dual-state caster apparatuses that include at least 602A, 602B. Dual-state caster apparatuses 602A, 602B may be of the same or similar structure to dual-state caster apparatuses shown in FIGS. 9A-17.

FIG. 23B is a cross-section taken through A-A of FIG. 23A. A brake control cable 642 will be described as viewed from the left side of elevating walker chair 600. An analogous brake control cable can be incorporated into elevating walker chair 600 on the right side. Brake control cable 642 is operationally connected to armrest 626L so that movement of armrest 626L can operate the braking system. The braking system can be configured so, for example, retraction, extension or pivotable movement of armrest 626L can operate the braking system, by either engaging or releasing the brake to arrest or allow motion of the wheels of elevating walking chair 600. Various paths can be used for brake control cable 642, provided it does not interfere with operation of elevating walking chair 600.

In FIG. 23B, brake control cable 642 extends from armrest 626L to upper frame component 644, and can be threaded through upper frame component 644, if hollow or attached along its exterior. Upper frame component 644 is a linkage between armrests 626 and seat mount block 658. Seat mount block 658 supports seat 628. Brake control cable 642 transitions from upper frame component 644, in the vicinity of attachment of upper frame component 644 and seat mount block 658, to an upper lift arm 646. Brake control cable 642 is further threaded through or around additional components of frame 610 until it is anchored at a brake cable swivel bearing, such as shown by brake cable swivel bearing 452 in FIGS. 12B, 13B and 14B, for example.

FIG. 24B is a cross-sectional view through C-C of elevating walker chair 600 as shown in FIG. 24A. FIG. 24B shows two positions a,b of brake input arm 648. FIG. 24C is a further cut-away showing positions a,b of brake input arm 648. Rotation of brake input arm 648 controls a brake lever, such as brake lever 450 shown in FIGS. 13B and 14B, via brake control cable 642. Brake input arm 648 may be operated by a brake control lever 650 or other brake control component or mechanism that is engaged with brake input arm 648 to control its rotational position. The brake control component may also directly control brake control cable 642. Various types of hand levers may be used. Any devices that effect the necessary action on the braking system can be used, and need not necessarily be hand operated. It is further noted that other configurations that will operated a brake lever are within this disclosure, provided they do not interfere with the operation of the apparatus of which they are a part.

Further shown in FIG. 24B armrest brake housing 652, which covers brake input arm 648. Armrest lower linkage plate 654 partially covers brake control cable 642 and provides openings 656 through which brake control cable 642 can pass.

FIG. 24C shows brake control lever 650 attached to brake input arm 648. By pulling upward on brake control lever 650, brake input arm 648 rotates, thereby pulling brake control cable 642 away from its location at the caster, and thus engaging the brake. By way of example, spring 460 (such as shown in FIG. 13B,C) may be compressed by the action of brake control lever 650, which in turn engages brake lever 450 with wheel 410.

Figure 25:
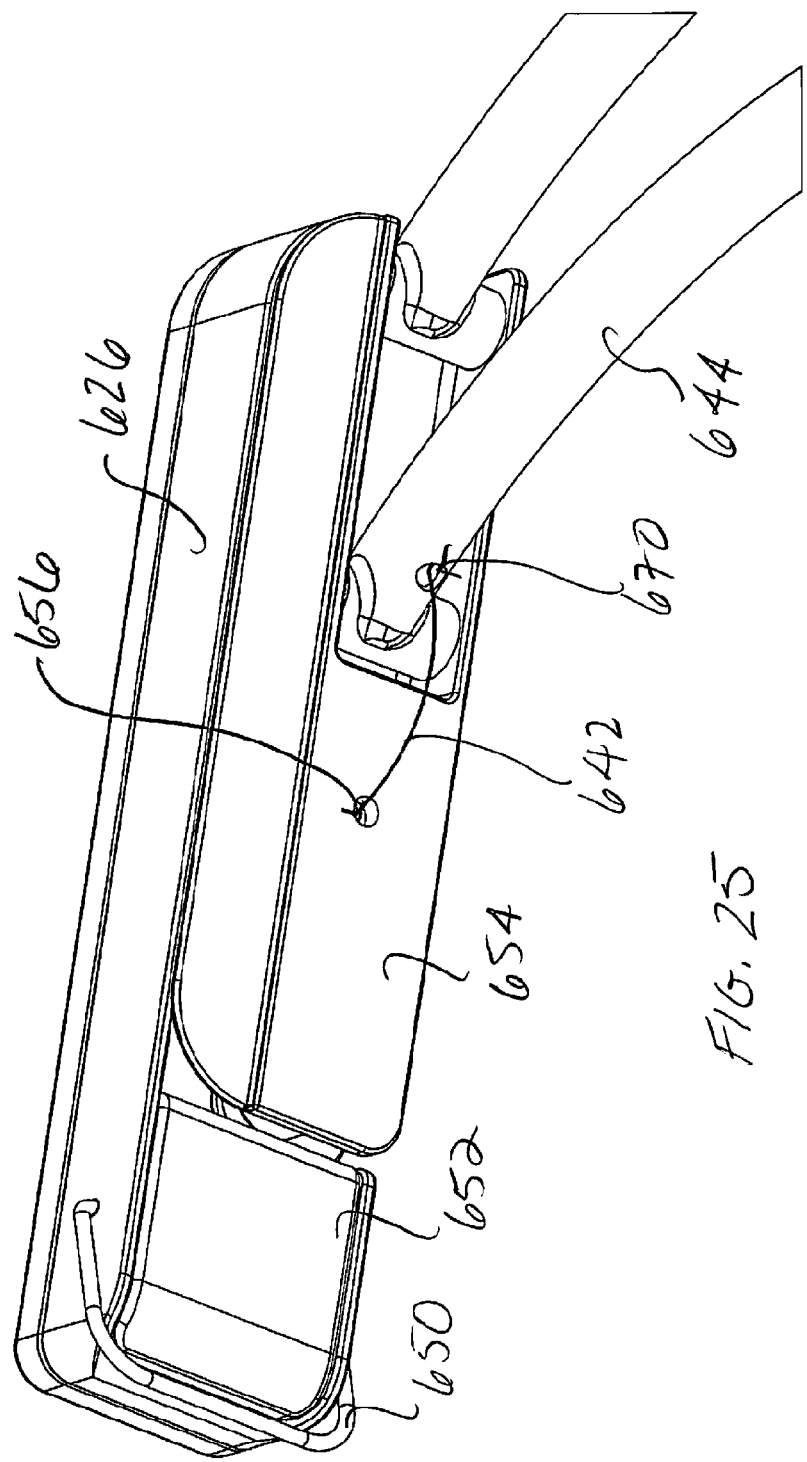
FIG. 25 depicts armrest and portions of a braking system.

FIG. 25 depicts armrest 626. Armrest 626 has in place armrest brake housing 652. Armrest lower linkage plate 654 is shown with brake control cable threaded through opening 656. Brake control cable 642 is shown disposed through opening 670 in upper frame component 644. Analogous armrests 626R, 626L can be used to operate brakes on a right wheel and left wheel.

It is noted that brake levers, such as part 450 shown in FIGS. 13B and 14B, can substituted with other braking mechanisms that can be controlled by cable 642 and that will arrest motion of a wheel. Examples include caliper brakes, having opposing parts that clamp a wheel or rim, and direct-pull, cantilever brakes.

Figure 32:
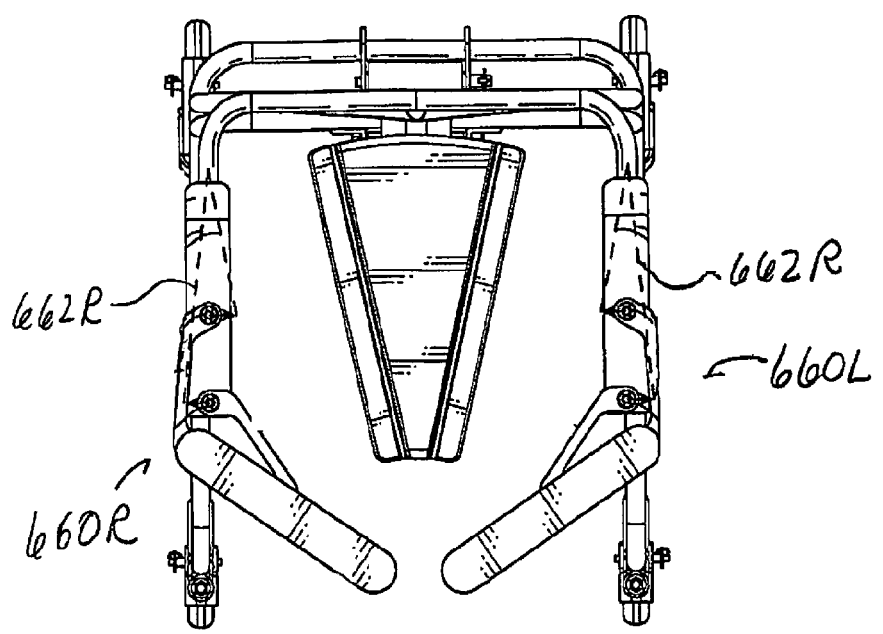
FIG. 32 depicts a top view of an elevating walker chair showing armrests in which a brake control cable is situated.
Figure 33:
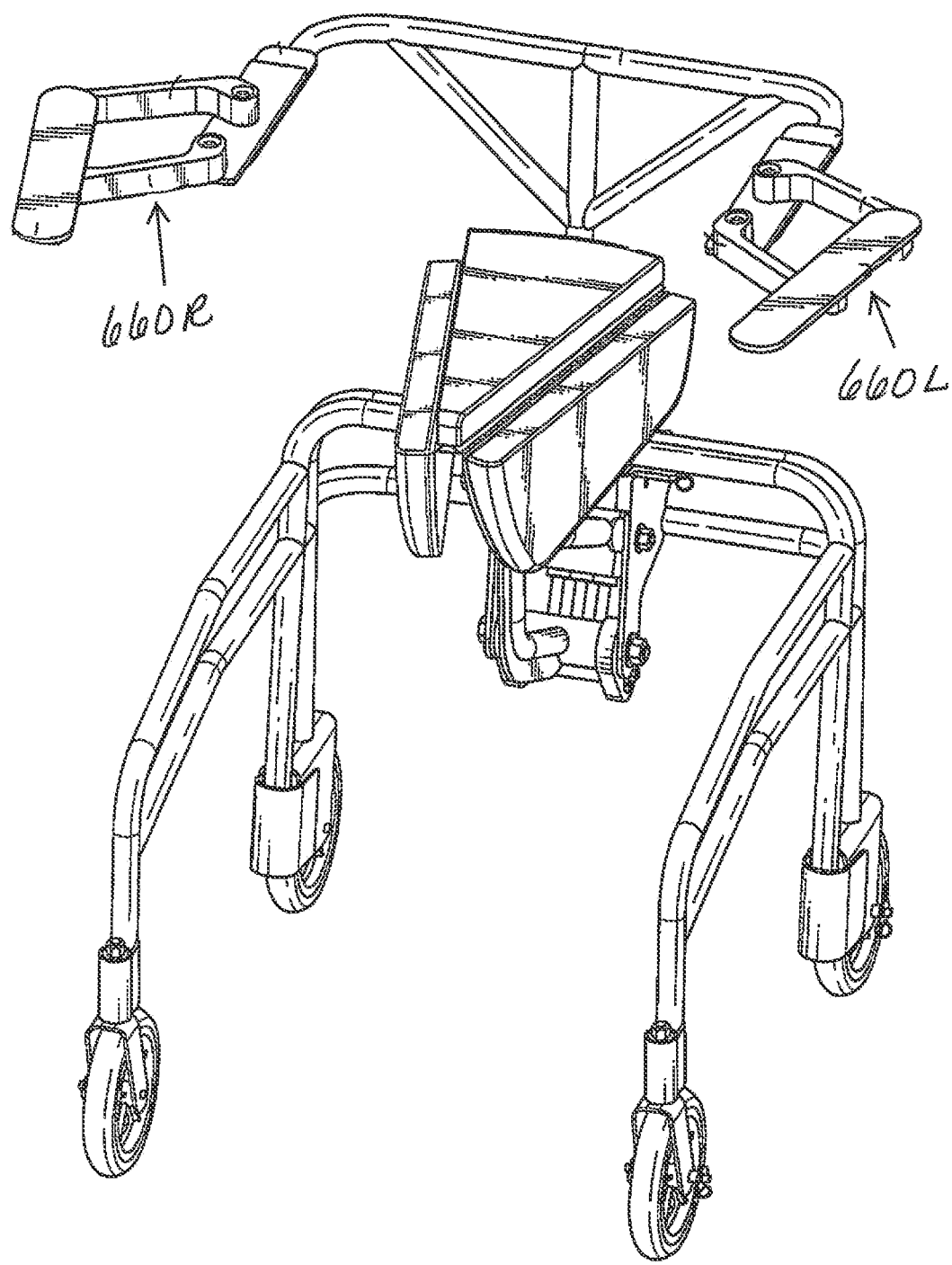
FIG. 33 is a perspective view of an elevating walker chair with extended armrests that can accommodate and actuate a braking system

Turning back to mechanisms to operate or engage brake control cable 642, FIGS. 32 and 33 show armrests 660L, 660R. In this illustrative embodiment, armrests 660R, 660L comprise two sections, an upper sections 664R, L and lower sections 666R, 666L that are pivotal with respect to one another. A brake control cable portion 662R, 662L is configured with respect to armrests 660R, 660L so that movement of upper armrest sections 664R, 664L shifts brake control cable portions 662R, 662L, thus controlling any brake mechanism attached to a brake control cable of which brake control cable portions 662R, 662L are a part.

Illustrative descriptions of two state change conditions will now be provided. The state change when transitioning from forward motion to rearward motion starting with the steering swivel axis angled at 7 degrees and transitioning to vertical is described with respect to FIG. 26 and FIGS. 27A-27D. The state change when transitioning from rearward motion to forward motion starting with the steering swivel axis at vertical and transitioning to a 7 degree axis is described with respect to FIG. 28 and FIGS. 29A-29D.

Figures 26A, 26B:
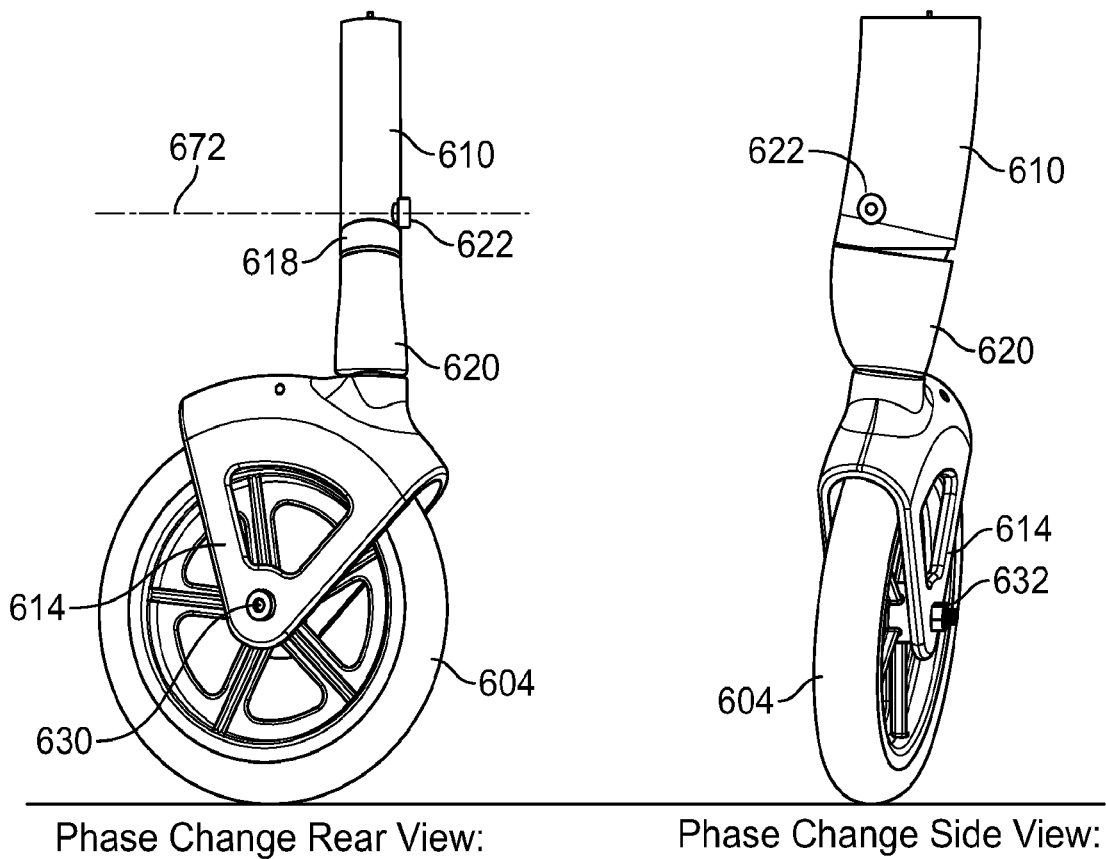
FIGS. 26A, B show a rear view and side view, respectively, of a dual-state caster with a state-change pivot axis transitioning from forward motion to rearward motion.

The handling characteristics of this state change caster arrangement, and any attached vehicle, is determined, at least in part, by the pivot position around which the state change occurs, for example pivots 422 or 622 in FIGS. 13B and 26B, respectively. In an illustrative example, the pivot position is located along a vertical line that intersects the contact patch on the ground when the offset is rotated 90 degrees from the forward travel orientation, and the caster is in its angled state. The position of state-change pivot 422 is not limited to the caster configuration as shown, for example in FIG. 2 or 12B, but may be elsewhere on that vertical line, as raising or lowering the pivot position along this line will also affect handling characteristics. For example, the pivot may be positioned to the rear of the center of the caster head.

As the caster is pushed rearwards, the offset causes the tire to rotate until the contact patch is substantially directly below the pivot axis. At this juncture, typically, less force is required to initiate the state change from the caster's angled to vertical orientation than would be required to continue rotating the caster wheel about the steering axis—due to the fact that rotating the wheel about the steering axis causes the vehicle to rise farther. Accordingly, if the pivot axis is on the vertical line, an attached vehicle will exhibit tracking in the forward direction, and will recover this forward direction even when perturbed to 90 degrees from its forward orientation.

In illustrative embodiments, vehicles resting on any number of state-change casters will steer freely rearwards, or sideways, once state change to vertical has occurred. Sideways steering stability may be enhanced by the fact that during state change from angled to vertical, the pivot axis moves rearward of the contact patch of the tire on the ground, and such, remains rearward for more than 180 degrees of rotation until it passes over the contact patch again, initiating state change back to angled.

FIGS. 26A, 26B show a state-change pivot axis 672 about which upper pivot component 618 rotates with respect to frame 610 about a steering axis. FIG. 26A is a rear view of dual-state caster apparatuses 602 and FIG. 26B is a side view.

Figure 27A:
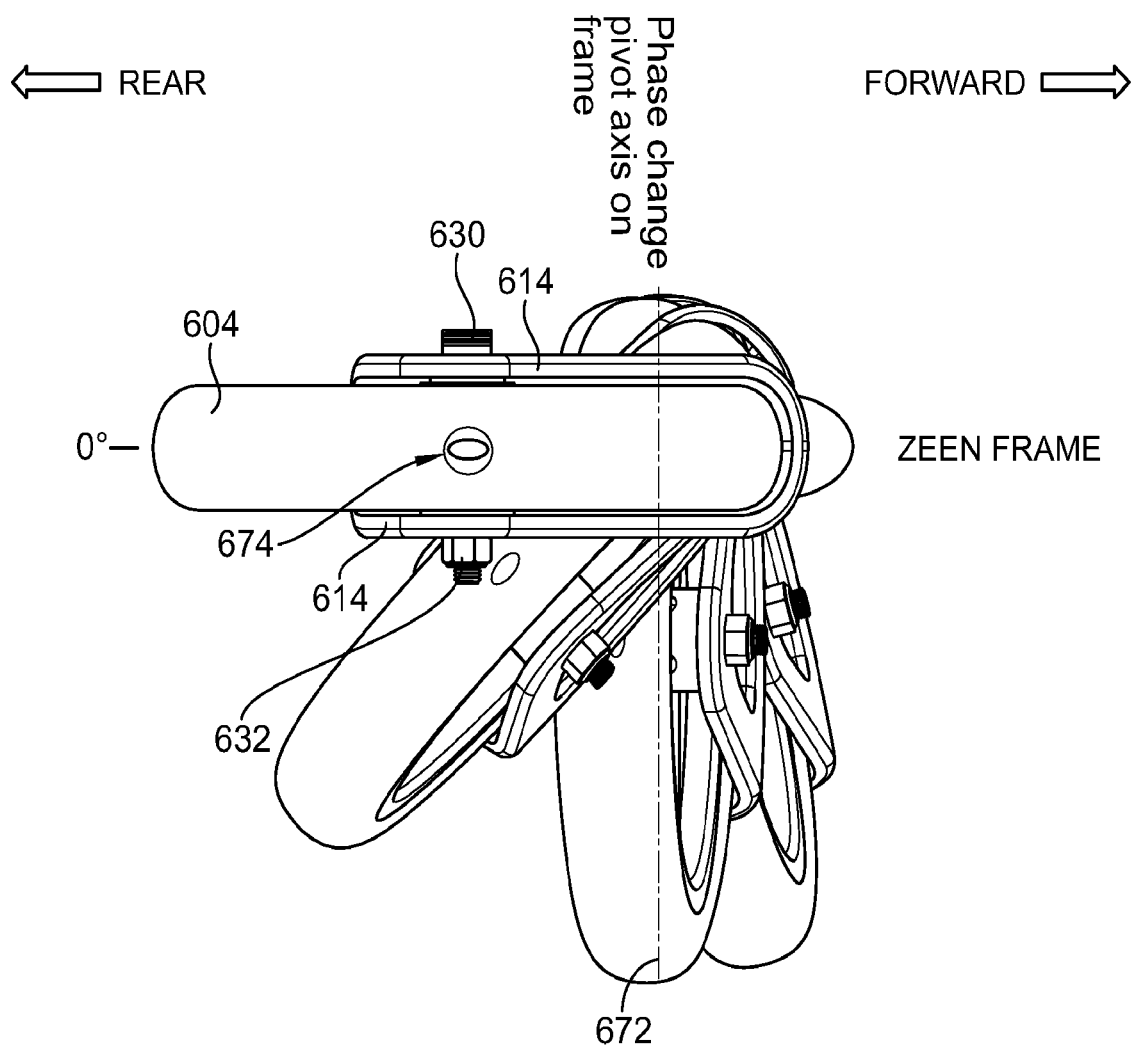
FIGS. 27A-D show a bottom view of a dual-state caster apparatus, as it rotates about a steering axis to transition from forward motion to rearward motion.
Figure 27B:
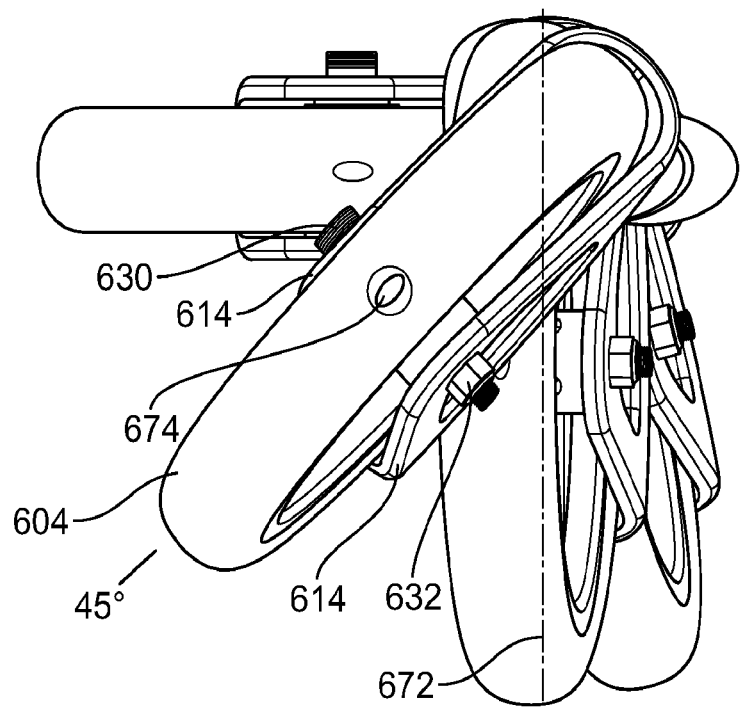
Figure 27C:
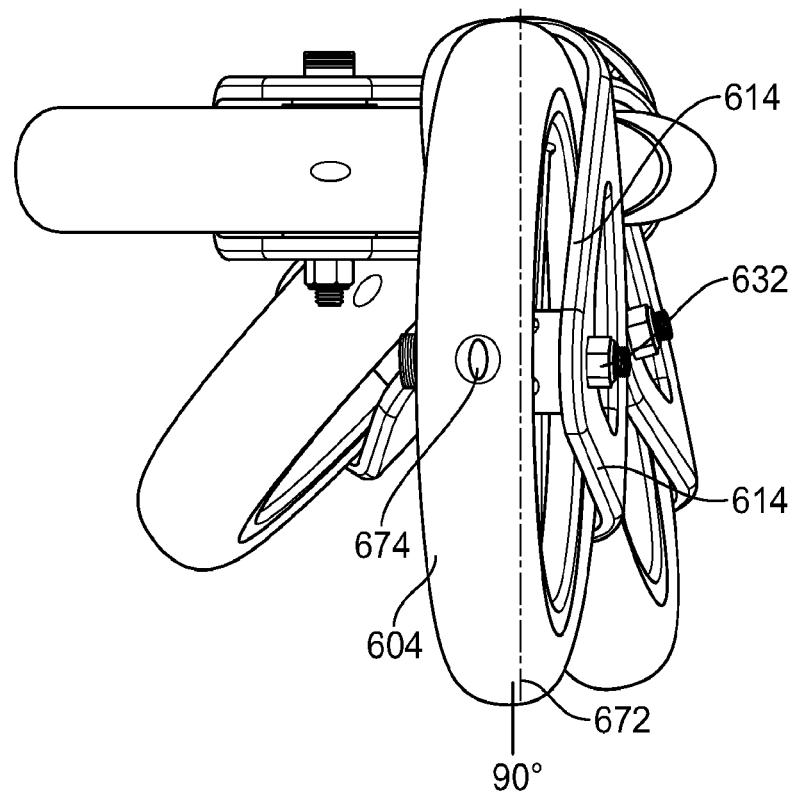
Figure 27D:
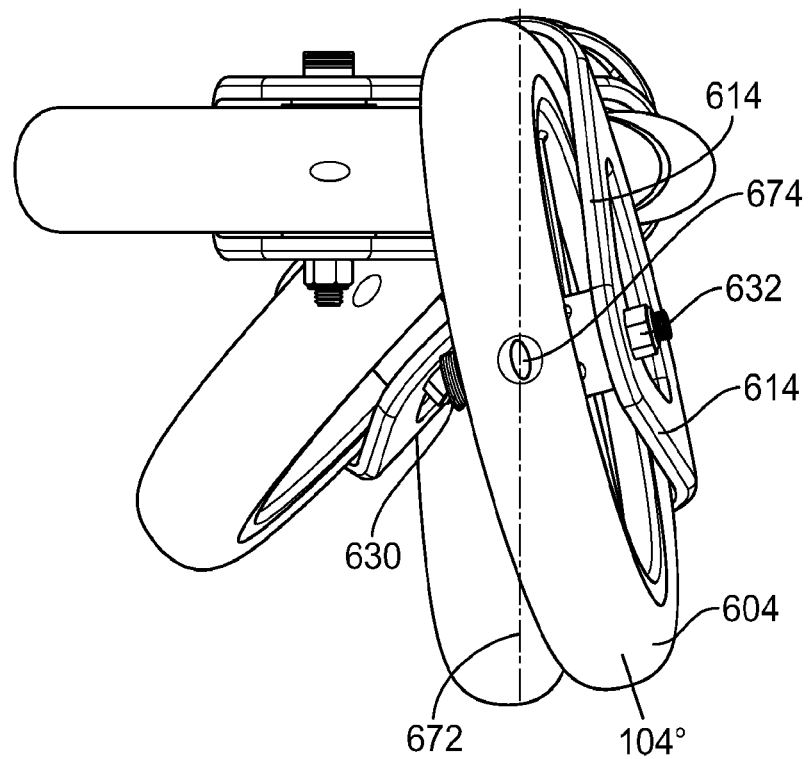

FIGS. 27A-27D show a view of dual-state caster apparatus 602 from the bottom, as it rotates about a steering axis to transition from forward motion to rearward motion. FIG. 27A highlights wheel 604 with forks 614 visible at position zero. In this position, wheel 604 is in line with the forward direction of motion. The contact patch is identified by reference 674. Contact patch 674 is 'significantly' rearward of the vertical plane in which state-change pivot axis 672 resides. As will be seen by following FIGS. 27A-27D, the position of contact patch 674 relative to state-change pivot axis 672 changes as dual-state caster apparatuses 602 rotates about its steering axis. FIG. 27B highlights wheel 604 at a 45 degree angle. At the 45 degree position contact patch 674 is still rearward of state-change pivot axis 672, but is not as far displaced from it as at the zero position. FIG. 27C highlights wheel 604 at a 90 degree angle. At 90 degrees, contact patch 674 is not yet beneath state-change pivot axis 672, but has moved 'significantly' closer. FIG. 27D highlights wheel 604 at a 104 degree angle. At 104 degrees, contact patch 674 is beneath; i.e. aligns with, state-change pivot axis 672. Thus, the zero position of rotation about the steering axis to 104 degrees constitutes the arc defining the "free swivel state" for this particular dual-state caster apparatuses 602 having a maximum steering axis angle of seven degrees.

Figures 28A, 28B:
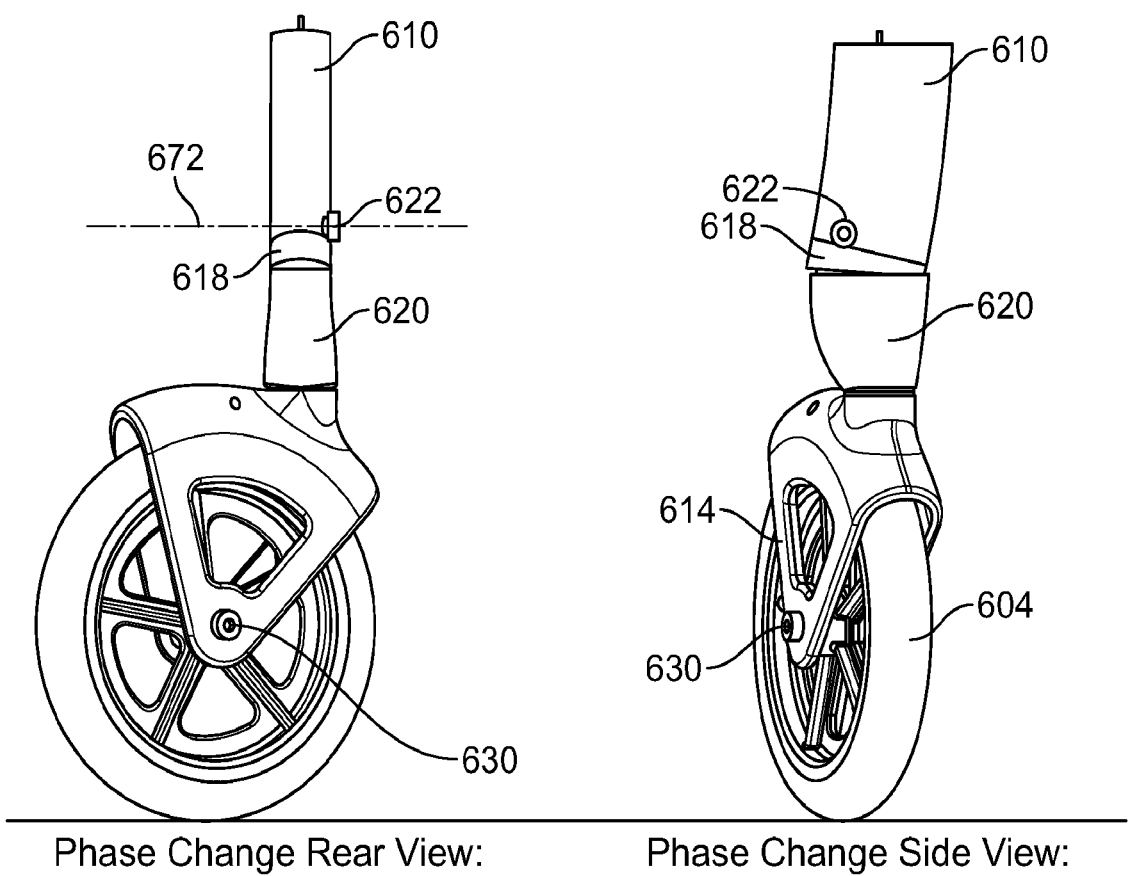
FIGS. 28A, B show a rear view and side view, respectively, of a dual-state caster with a state-change pivot axis transitioning from rearward motion to forward motion.

FIGS. 28A, 28B show a state-change pivot axis 672 about which upper pivot component 618 rotates with respect to frame 610 about a steering axis. FIG. 28A is a rear view of dual-state caster apparatuses 602 and FIG. 28B is a side view.

Figure 29A:
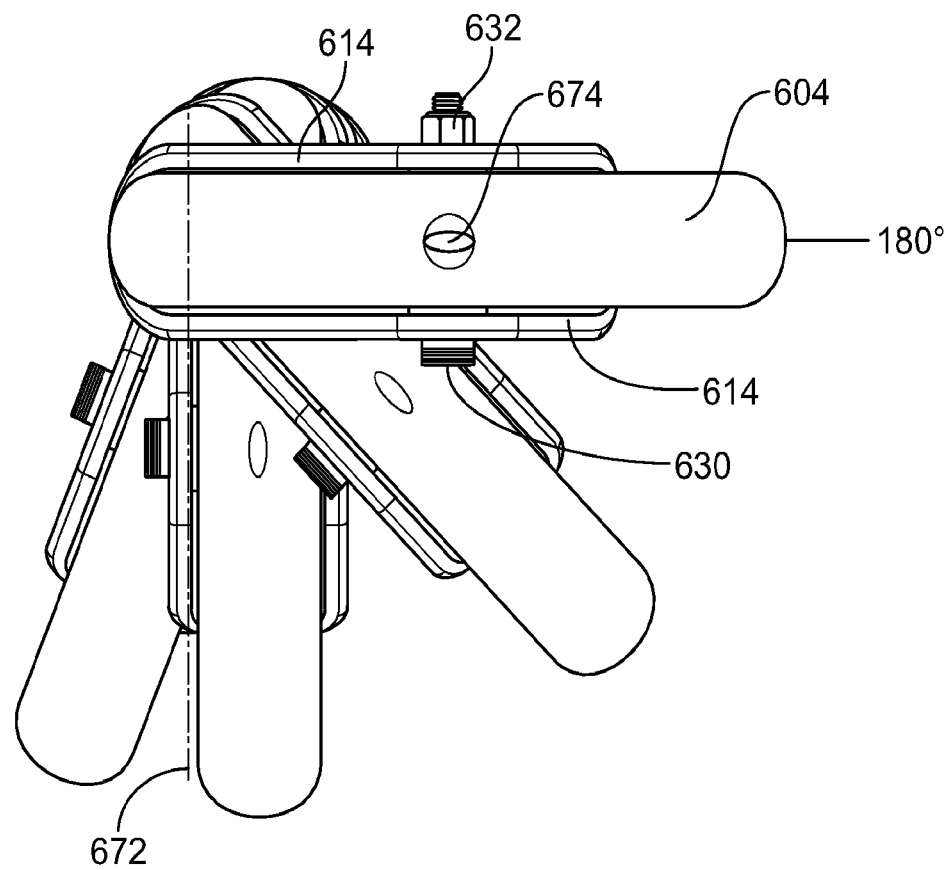
FIGS. 29A-D show a bottom view of a dual-state caster apparatus, as it rotates about a steering axis to transition from rearward motion to forward motion.
Figure 29B:
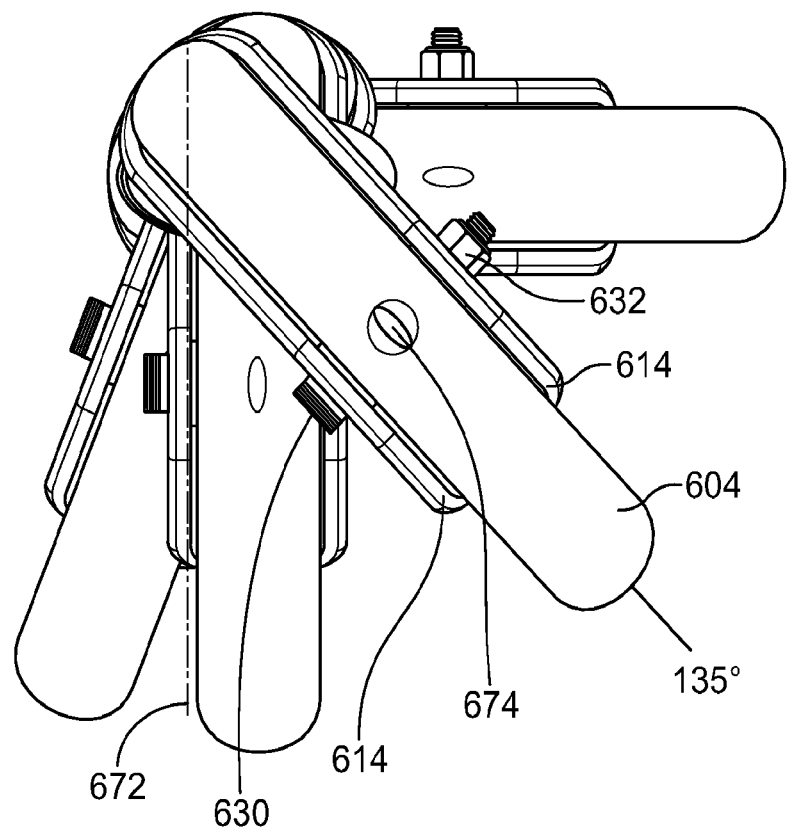
Figure 29C:
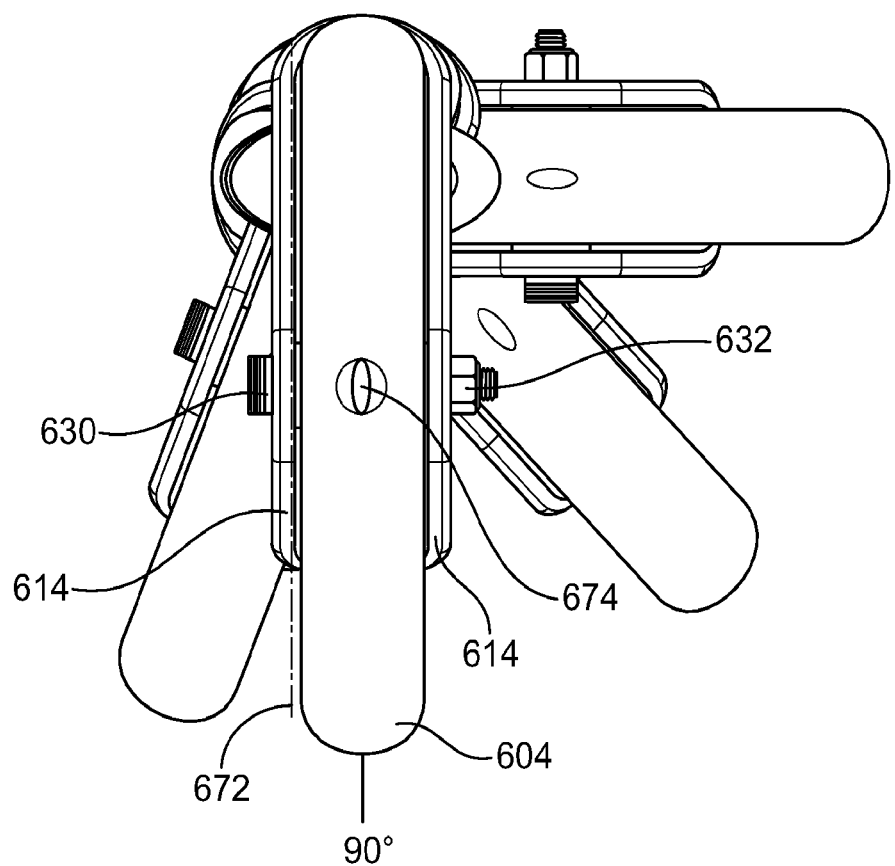
Figure 29D:
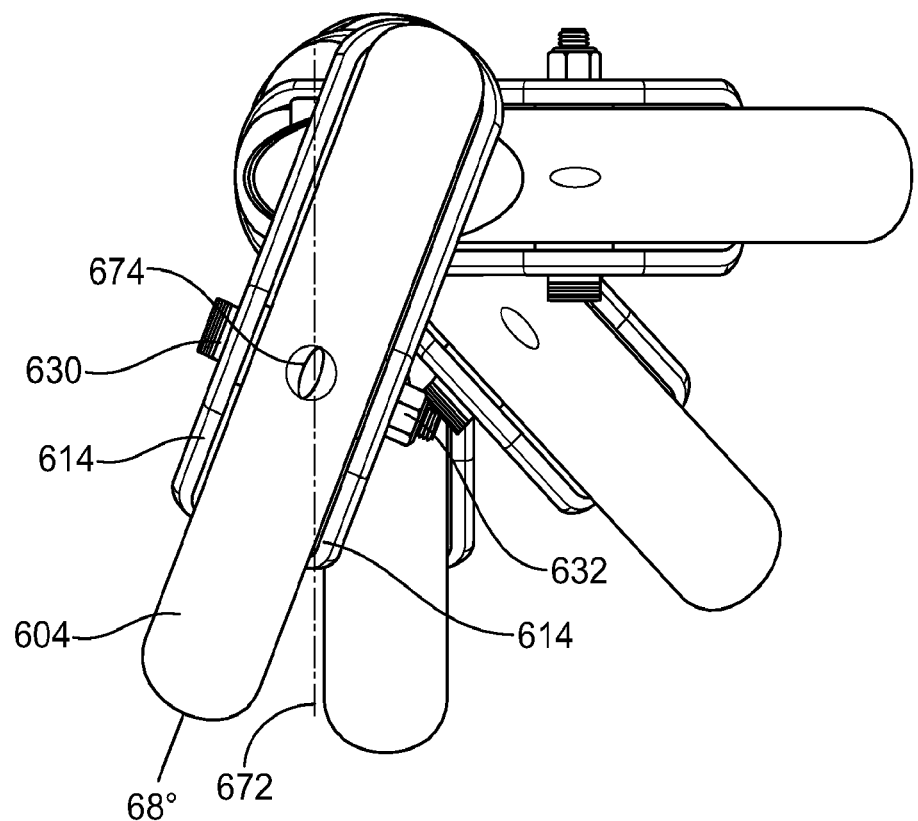

FIGS. 29A-29D show a view of dual-state caster apparatus 602 from the bottom, as it rotates about a steering axis to transition from rearward motion to forward motion. FIG. 29A highlights wheel 604 with forks 614 visible at position 180 degrees. In this position, wheel 604 is in line with the forward direction of motion. The contact patch is identified by reference 674. Contact patch 674 is 'significantly' forward of the vertical plane in which state-change pivot axis 672 resides. As will be seen by following FIGS. 29A-29D, the position of contact patch 674 relative to state-change pivot axis 672 changes as dual-state caster apparatuses 602 rotates about its steering axis. FIG. 29B highlights wheel 604 at a 135 degree angle. At this position the contact patch 674 is still forward of state-change pivot axis 672, but is not as far displaced from it as at the 180 degree position. FIG. 29C highlights wheel 604 at a 90 degree angle. At 90 degrees, contact patch 674 is not yet beneath state-change pivot axis 672, but has moved 'significantly' closer. FIG. 29D highlights wheel 604 at a 68 degree angle. At 68 degrees, contact patch 674 is beneath state-change pivot axis 672. Thus, the 180 degree position of rotation about the steering axis to the plus and minus 68 degrees constitutes the arc defining the "free swivel state" for this particular dual-state caster apparatuses 602 having a maximum steering axis angle of seven degrees. Thus, the size of the free swivel state arc during rearward motion is greater than the free swivel state arc during forward motion, when other parameters are the same.

Other factors that affect the size of the free swivel state arc include, for example, whether the wheel has a rounded or squarer profile (as will be described below), size of the caster offset, and in some instances the firmness of the wheel.

Figure 30:
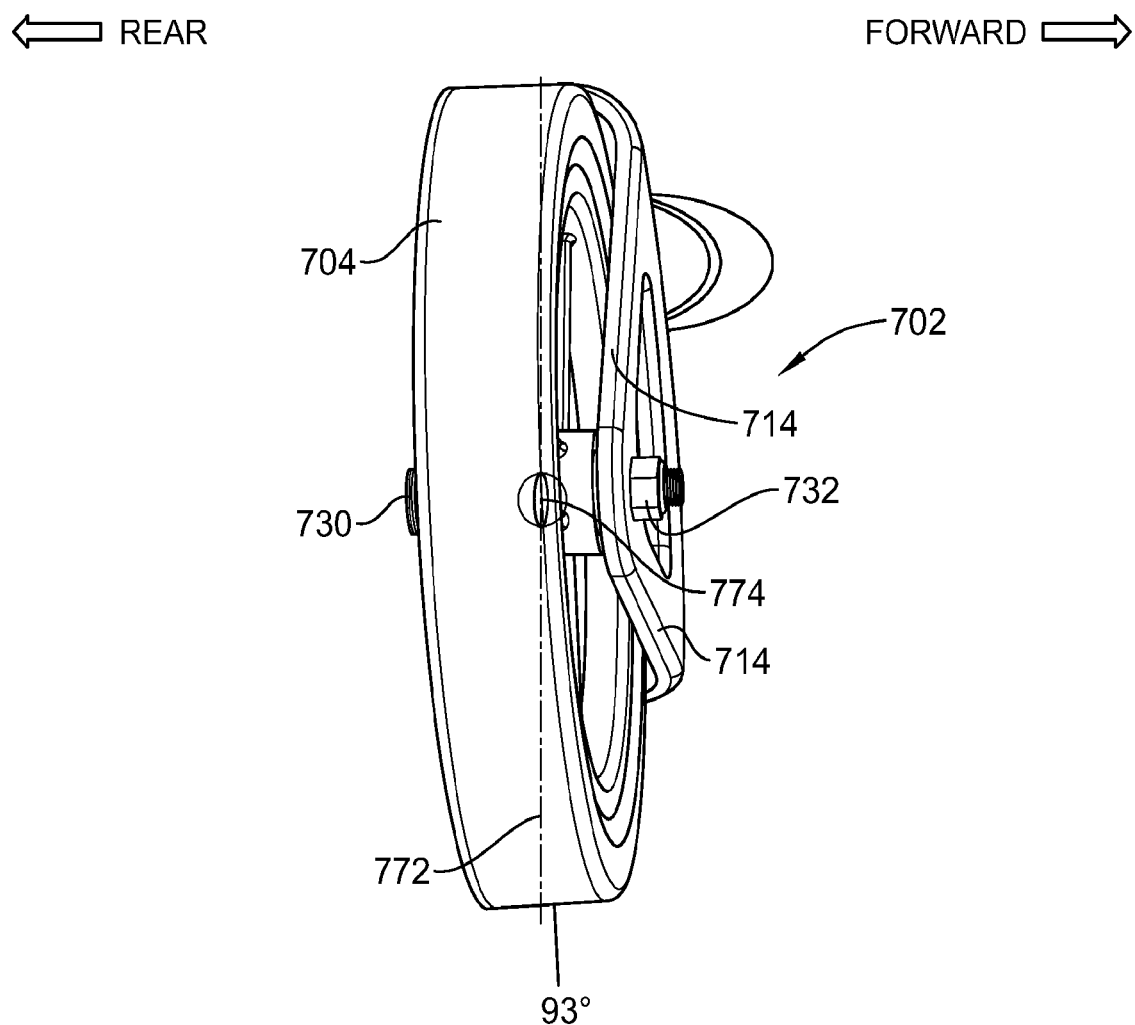
FIG. 30 depicts a dual-state caster apparatus with a tire having a squarer cross-section profile motion, wherein the caster apparatus is transitioning from forward motion to rearward motion.

FIG. 30 depicts dual-state caster apparatus 702 for a transition from forward motion to rearward motion. FIG. 30 shows a contact patch 774 of a square profile tire 704 when it is at an angle of 93 degrees, as rotated about a steering axis. Contact patch 774 is directly below state-change pivot axis 772 at 93 degrees rotation.

Figure 31:
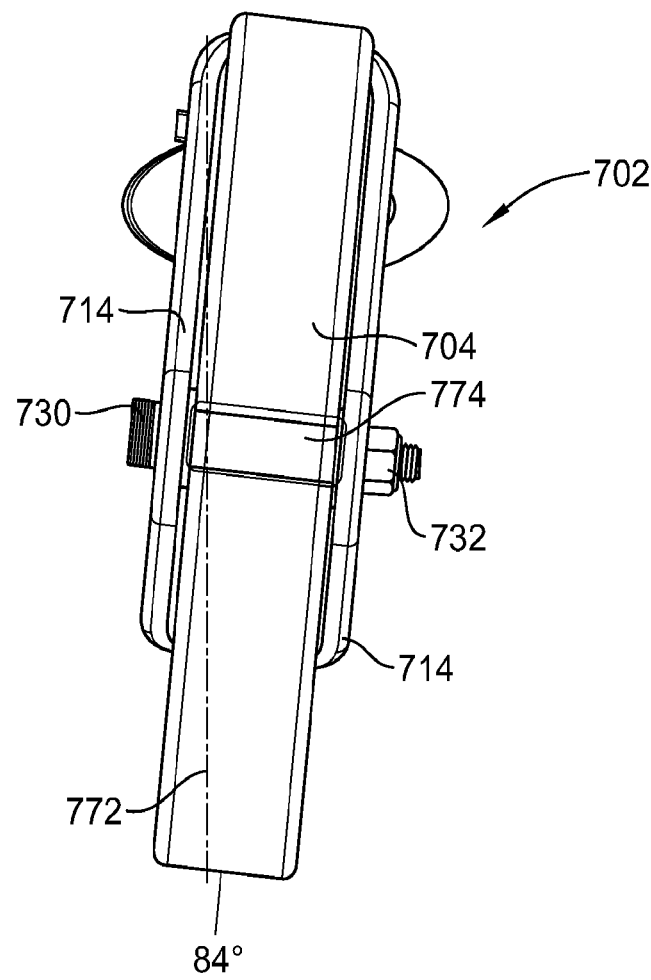
FIG. 31 depicts dual-state caster apparatus with a tire having a squarer cross-section profile motion, wherein the caster apparatus is transitioning from rearward motion to forward motion.

FIG. 31 depicts dual-state caster apparatus 702 from below for a transition from rearward motion to forward motion. FIG. 30 shows a contact patch 774 of a square profile tire 704 when it is at an angle of 84 degrees, as rotated about a steering axis. Contact patch 774 is directly below state-change pivot axis 772 at 84 degrees of rotation about the steering axis.

The dual-state caster embodiments described herein may retain front-wheel steering, but make the rear end more agile. Furthermore, the wheel may rotate like a regular caster, but track in a desired direction, and allow for the attachment of differing types and sizes of tire to deal with different surfaces. Additionally, the wheel may rotate like a regular caster and track in a desired direction, but yet the direction may be reversed without or with minimal unwanted directional deviations. Accordingly, embodiments of the dual-state casters may provide a technical advance over conventional casters.

The terms "rearward" and "forward" are used broadly and include motion in addition to straight forward or backward.

Various embodiments of the invention have been described, each having a different combination of elements. The invention is not limited to the specific embodiments disclosed, and may include different combinations of the elements disclosed, omission of some elements or the replacement of elements by the equivalents of such structures.

While the invention has been described by illustrative embodiments, additional advantages and modifications will occur to those skilled in the art. Therefore, the invention in its broader aspects is not limited to specific details shown and described herein. Modifications, for example, to dimensions, combination of features and apparatuses on which the casters may be used, and incorporation of equivalent components, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A caster apparatus comprising:
a caster head configured to be rotationally connected to a fork, the fork having a wheel axle extending therethrough, wherein the fork swivels with respect to the caster head about a steering axis via a swivel pivot axle and wherein the wheel axle is offset from the steering axis;
the caster head having an upper pivot component pivotally connected about a state-change pivot to a lower housing, the swivel pivot axle extending through the lower housing;

the state-change pivot having an axis wherein the axis of the state-change pivot is positioned offset from the steering axis;

wherein the state-change pivot axis offset position is configured to change an angle of the steering axis with respect to vertical of the caster apparatus;

the upper pivot component not flush with the lower housing thereby creating an interface between the upper pivot component and the lower housing to allow and limit rotation of the upper pivot component about the state-change pivot; a state pivot support extending from the lower housing on a lower housing side opposite the fork;

the swivel pivot axle extending at least partially through the lower housing; and a first portion of the lower housing on a first side of the swivel pivot axle and a second portion of the lower housing on an opposing, second side of the swivel pivot axle, wherein the state pivot support is on the first portion of the lower housing; wherein when the fork rotates with respect to the caster head about the swivel pivot axle, and changes the position of the wheel axle from being on the first side of the swivel pivot axle to being on the second side of the swivel pivot axle, or vice versa, the fork rotation causes a state change, wherein a state change is a change between the steering axis being vertical and the steering axis being angled from vertical; and wherein the state-change pivot axis is above the wheel axle when the fork is rotated to a position that is approximately 90 degrees from its forward-travel orientation and the steering axis is angled from the vertical.

2. The caster apparatus of claim 1 wherein the state change pivot offset is positioned to change the steering axis of the caster apparatus by an angle in a range of 3 degrees to 15 degrees from the vertical.

3. The caster apparatus of claim 1 wherein the state change pivot offset is positioned to change the steering axis of the caster apparatus by an angle in a range of 5 degrees to 10 degrees from the vertical.

4. The caster apparatus of claim 1 wherein the state change pivot offset is positioned to change the steering axis of the caster apparatus by an angle in a range of 6 degrees to 8 degrees from the vertical.

5. The caster apparatus of claim 1 wherein the swivel pivot is disposed within one or more bearing components to allow rotation of the swivel pivot axle within the lower housing.

6. The caster apparatus of claim 1 further comprising a brake apparatus configured to allow rotation of the wheel about the steering axis and arrest motion of the wheel when engaged.

7. The caster apparatus of claim 6 wherein the brake apparatus comprises:
   a brake control cable having a proximate end and a distal end;
   a brake cable swivel bearing;
   the brake control cable proximate end secured to the brake cable swivel bearing; and
   the brake control cable distal end fixed to a brake input arm.

8. The caster apparatus of claim 6 wherein the brake cable swivel bearing is disposed within a brake lever.

9. The caster apparatus of claim 1 further comprising a chair having at least two caster apparatuses.

10. The caster apparatus of claim 9 further comprising a chair having four caster apparatuses.

11. The caster apparatus of claim 1 wherein the angle of the steering axis with respect to a vertical position is selectably adjustable.

12. A cart having a plurality of caster apparatuses according to claim 1.

13. The cart of claim 12 wherein the cart is propelled by human power.

14. The cart of claim 12 further comprising an electronic control unit configured to impart motion to the wheels of the caster apparatuses and control directions of movement of the wheels.

15. A method of mobilizing an apparatus comprising:
   providing an apparatus having one or more casters according to claim 1;
   mobilizing the apparatus via mechanical or electrical power.

* * * * *